United States Patent
Taha et al.

(10) Patent No.: US 9,107,168 B2
(45) Date of Patent: Aug. 11, 2015

(54) METHODS AND APPARATUSES FOR PREEMPTIVE BATTERY VOLTAGE MANAGEMENT IN MULTI-SIM MOBILE DEVICES

(71) Applicant: QUALCOMM Incorporated, San Diego, CA (US)

(72) Inventors: Ali Taha, San Diego, CA (US); Francis Ming-Meng Ngai, Louisville, CO (US); Amit Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 13/778,503

(22) Filed: Feb. 27, 2013

(65) Prior Publication Data

US 2014/0080459 A1    Mar. 20, 2014

Related U.S. Application Data

(60) Provisional application No. 61/702,825, filed on Sep. 19, 2012.

(51) Int. Cl.
  *H04M 3/42* (2006.01)
  *H04W 52/02* (2009.01)
  *H04W 76/02* (2009.01)

(52) U.S. Cl.
  CPC ...... *H04W 52/0287* (2013.01); *H04W 52/0209* (2013.01); *H04W 76/025* (2013.01); *Y02B 60/50* (2013.01)

(58) Field of Classification Search
  CPC . H04W 88/08; H04W 76/048; H04L 63/0853
  USPC .......... 455/522, 67.11, 574, 412.1, 558, 63.1, 455/414.1, 411, 418, 552.1, 404.1; 370/252
  See application file for complete search history.

(56) References Cited

U.S. PATENT DOCUMENTS

| | | | |
|---|---|---|---|
| 2006/0234693 A1* | 10/2006 | Isidore et al. | 455/422.1 |
| 2008/0176594 A1 | 7/2008 | Song et al. | |
| 2008/0300027 A1* | 12/2008 | Dou et al. | 455/574 |
| 2010/0130245 A1* | 5/2010 | Iseda | 455/522 |
| 2012/0021707 A1 | 1/2012 | Forrester et al. | |
| 2012/0221877 A1* | 8/2012 | Prabu | 713/340 |

FOREIGN PATENT DOCUMENTS

WO    2007096683 A1    8/2007

OTHER PUBLICATIONS

International Search Report and Written Opinion—PCT/US2013/060743, International Search Authority—European Patent Office, Dec. 18, 2013.

* cited by examiner

*Primary Examiner* — Kiet Doan
(74) *Attorney, Agent, or Firm* — Darren M. Simon

(57) ABSTRACT

Apparatus and methods for power control management in a user equipment (UE) include establishing a first call and a second call at the UE, wherein the first call is associated with a first subscription and the second call is associated with a second subscription. Further, the apparatus and methods include determining concurrency of the first call and the second call. The apparatus and methods also includes adjusting a power level or operating frequency associated with at least one UE component based on determining the concurrency of the first call and the second call.

33 Claims, 18 Drawing Sheets

METHODS AND APPARATUSES FOR PREEMPTIVE BATTERY VOLTAGE MANAGEMENT IN MULTI-SIM MOBILE DEVICES

CLAIM OF PRIORITY UNDER 35 U.S.C. §119

The present Application for Patent claims priority to Provisional Application No. 61/702,825 entitled "Methods and Apparatuses for Preemptive Battery Voltage Management in Multi-SIM Mobile Devices" filed Sep. 19, 2012, and assigned to the assignee hereof and hereby expressly incorporated by reference herein.

BACKGROUND

1. Field

Aspects of the present disclosure relate generally to wireless communication systems, and more particularly, to improving power resource management in mobile devices.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, some wireless networks—especially networks in China and India—now provide wireless services for devices (also known as user equipment (UE)) that are configured to concurrently engage in more than one primary voice and/or data call. Such devices are known as Dual Standby Dual Active (DSDA) devices. Mobile device designers and manufacturers have found that deploying DSDA involves solving challenging technical problems that must be addressed before these devices can be successfully commercialized. One of these challenges consists of a problem, often called battery droop (or VBat droop; also referred to as battery output voltage drop or VBat drop), wherein a DSDA UE experiences a sudden and significant drop in battery output voltage. This problematic effect is often caused by high current spikes generated when two simultaneous active calls and/or data paths attempt to transmit signals at the same time, therefore necessitating a large instantaneous source current demand from a battery of the wireless device or user equipment (UE). Further complicating this power-management problem is the reality that different UE components often compete for allocation of limited battery power resources.

Therefore, this coincident problem presents a need for methods and apparatuses to manage such resource requests preemptively and in a way that is feasible to implement without overwhelming the software or without a massive UE component re-architecture.

BRIEF DESCRIPTION OF THE DRAWINGS

In one aspect, a method for power control management in a user equipment (UE) includes establishing a first call and a second call at the UE, wherein the first call is associated with a first subscription and the second call is associated with a second subscription. The method further includes determining concurrency of the first call and the second call. Moreover, the method includes adjusting a power level or operating frequency associated with at least one UE component based on determining the concurrency of the first call and the second call.

Another aspect of the disclosure provides an apparatus for power control management in a user equipment (UE) includes means for establishing a first call and a second call at the UE, wherein the first call is associated with a first subscription and the second call is associated with a second subscription. The apparatus further includes means for determining concurrency of the first call and the second call. Moreover, the apparatus includes means for adjusting a power level associated with at least one UE component based on determining the concurrency of the first call and the second call.

In a further aspect, a computer-readable storage medium for power control management in a user equipment (UE) includes machine-executable code for establishing a first call and a second call at the UE, wherein the first call is associated with a first subscription and the second call is associated with a second subscription. The computer-readable storage medium further includes machine-executable code for determining concurrency of the first call and the second call. Moreover, the computer-readable storage medium includes machine-executable code for adjusting a power level associated with at least one UE component based on determining the concurrency of the first call and the second call.

Additional aspects provide an apparatus for power control management in a user equipment (UE) comprising at least one processor and a memory coupled to the at least one processor. The at least one processor can be configured to establish a first call and a second call at the UE, wherein the first call is associated with a first subscription and the second call is associated with a second subscription. The at least one processor can be further configured to determine concurrency of the first call and the second call. Moreover, the at least one processor can be further configured to adjust a power level or operating frequency associated with at least one UE component based on determining the concurrency of the first call and the second call.

BRIEF DESCRIPTION OF THE DRAWINGS

Figure 1:
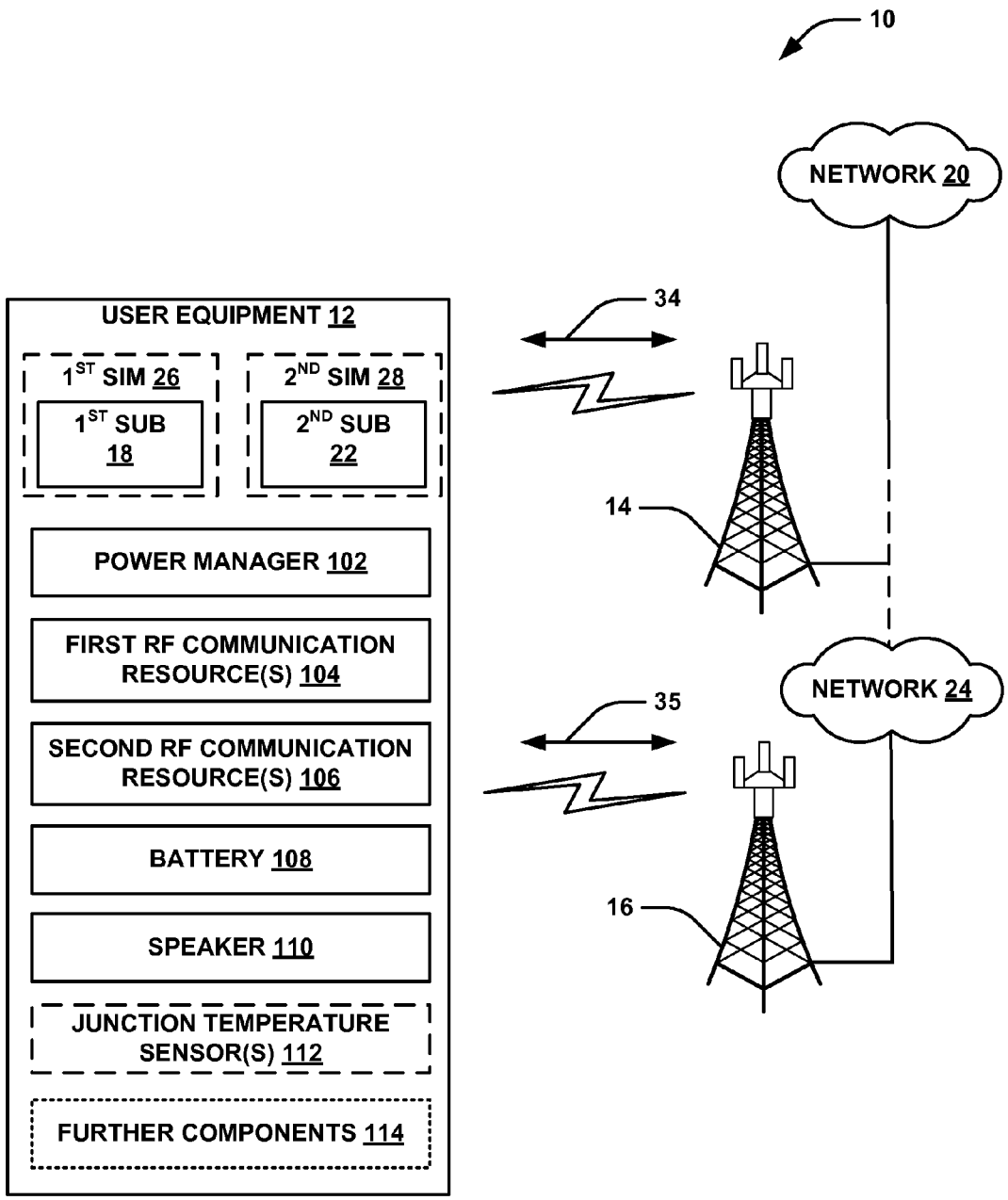
Figure 2:
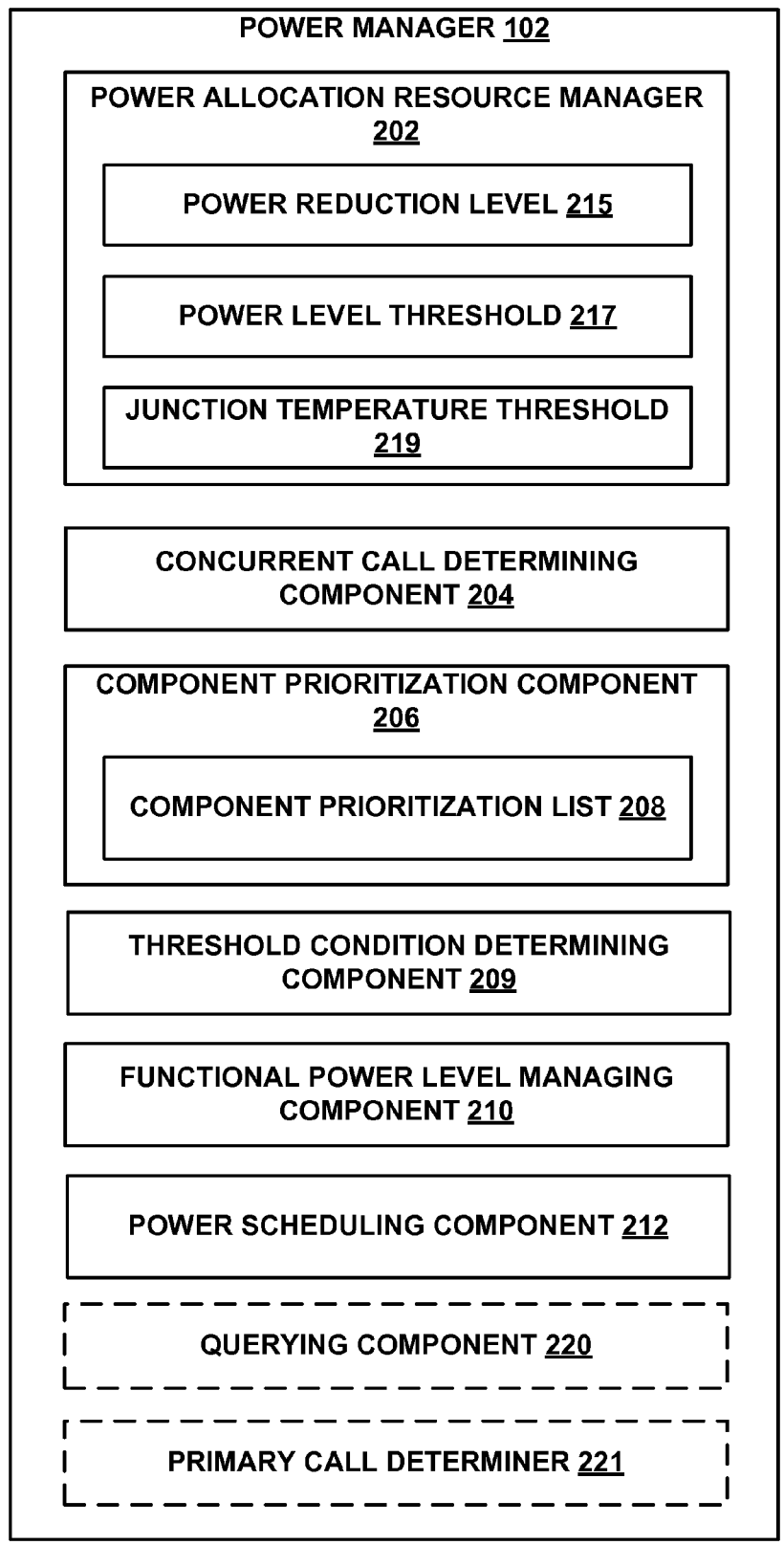
Figure 3:
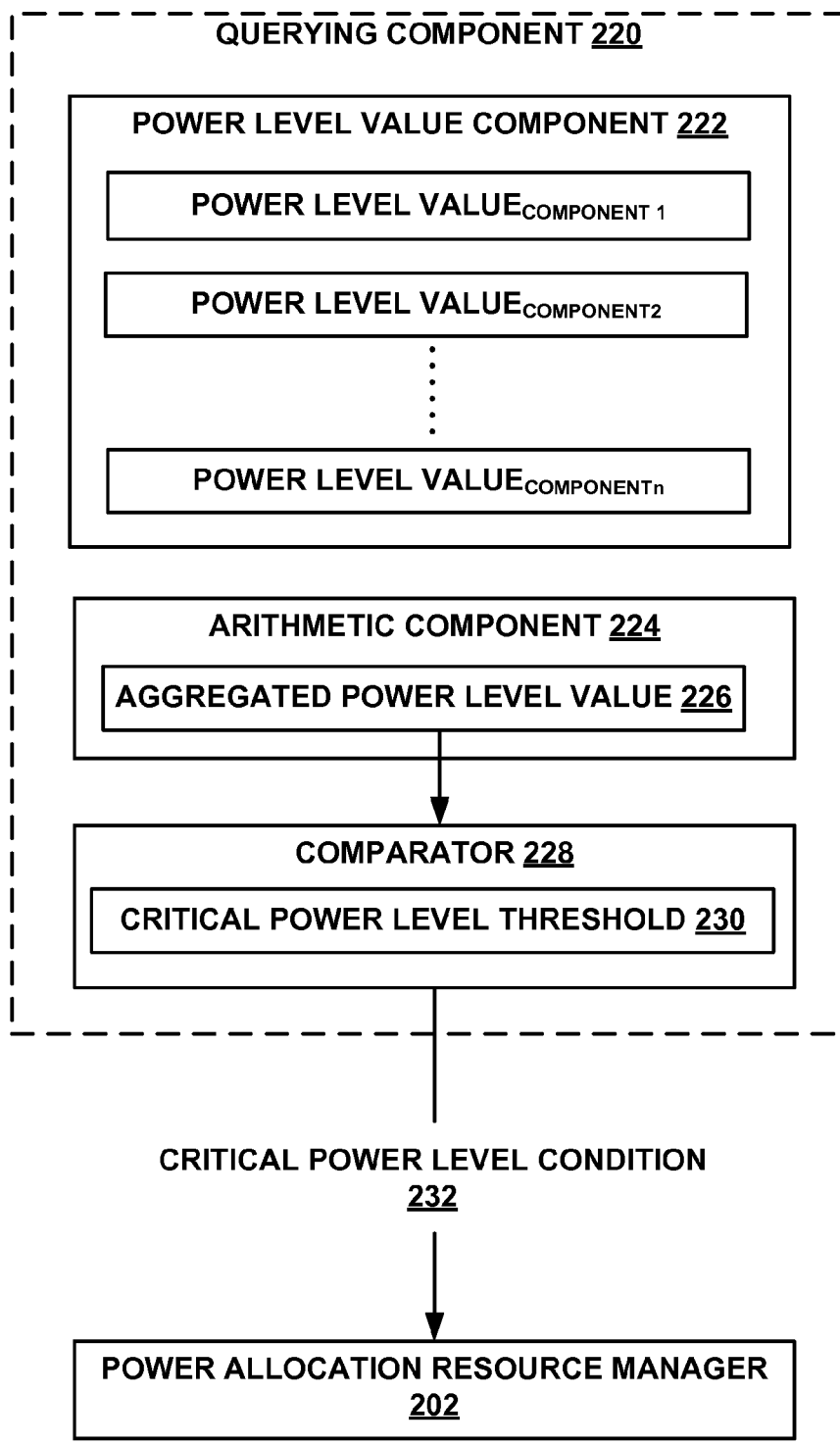
Figure 4:
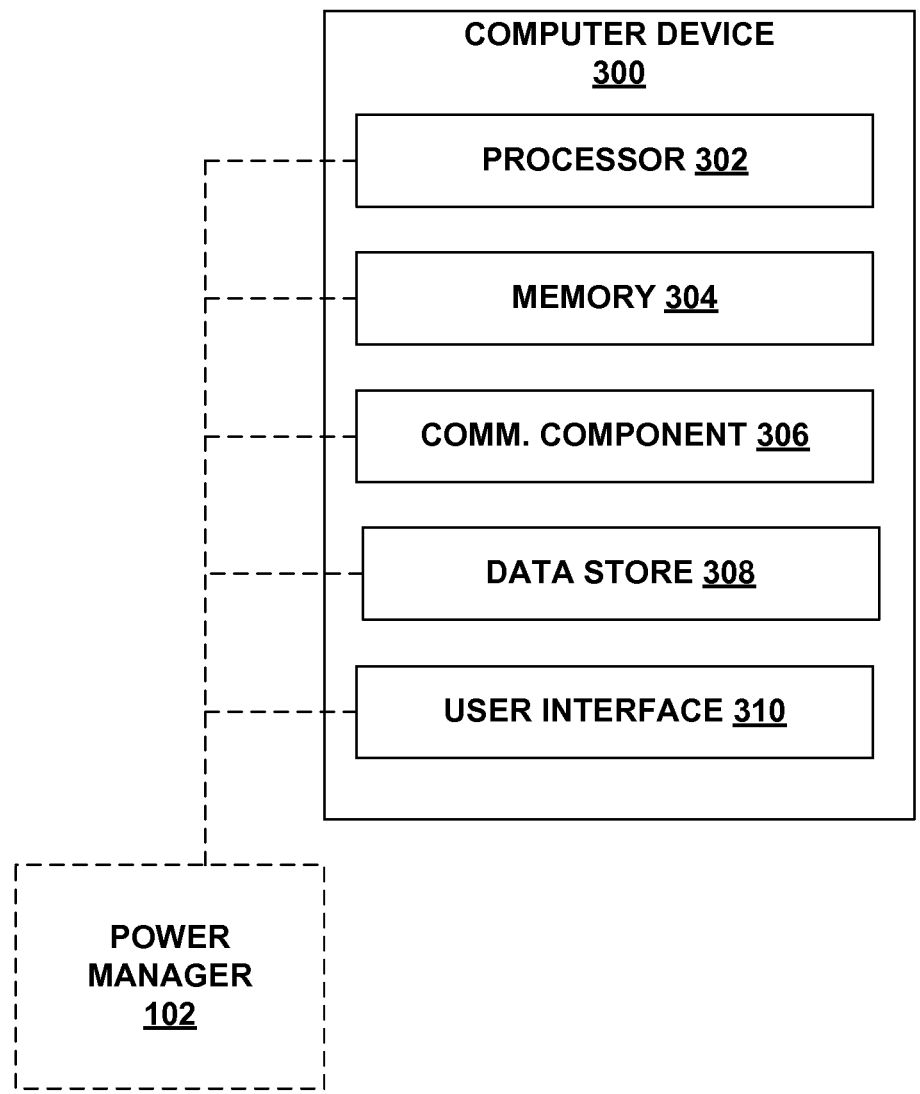
Figure 5:
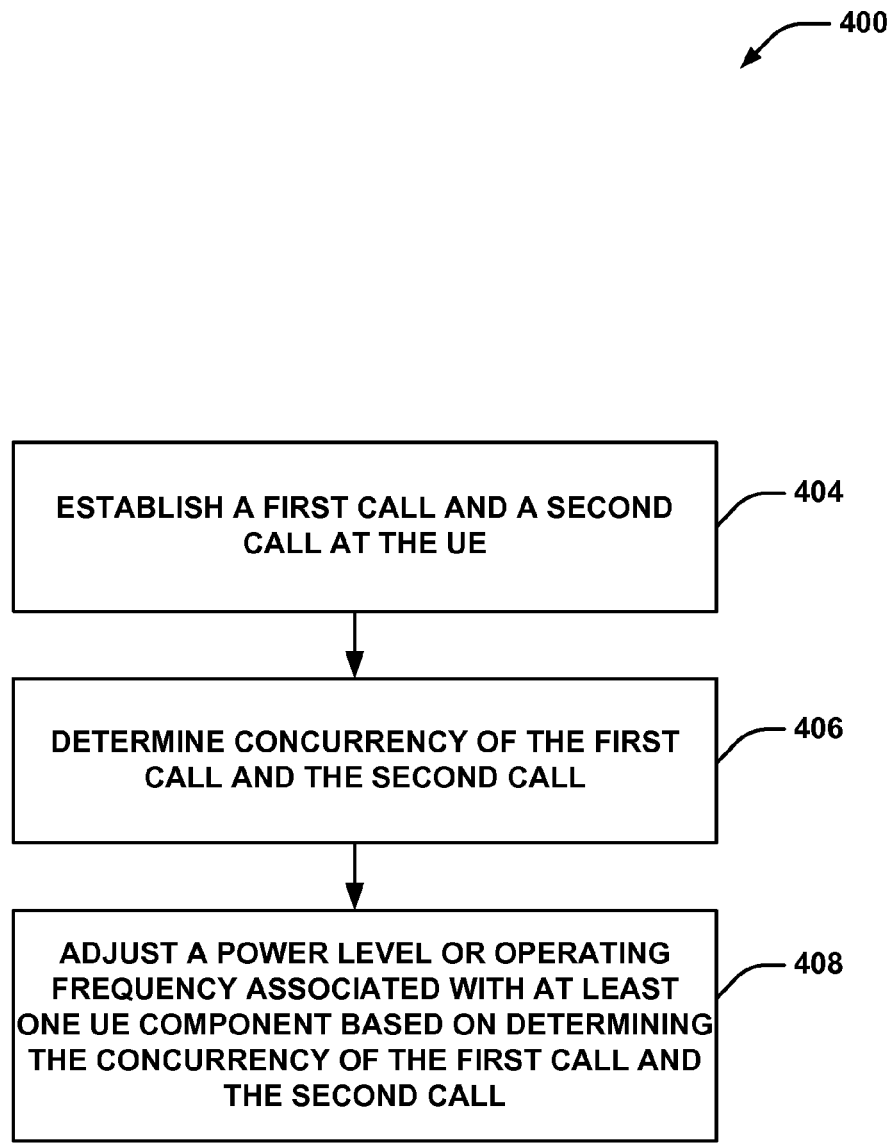
Figure 6:
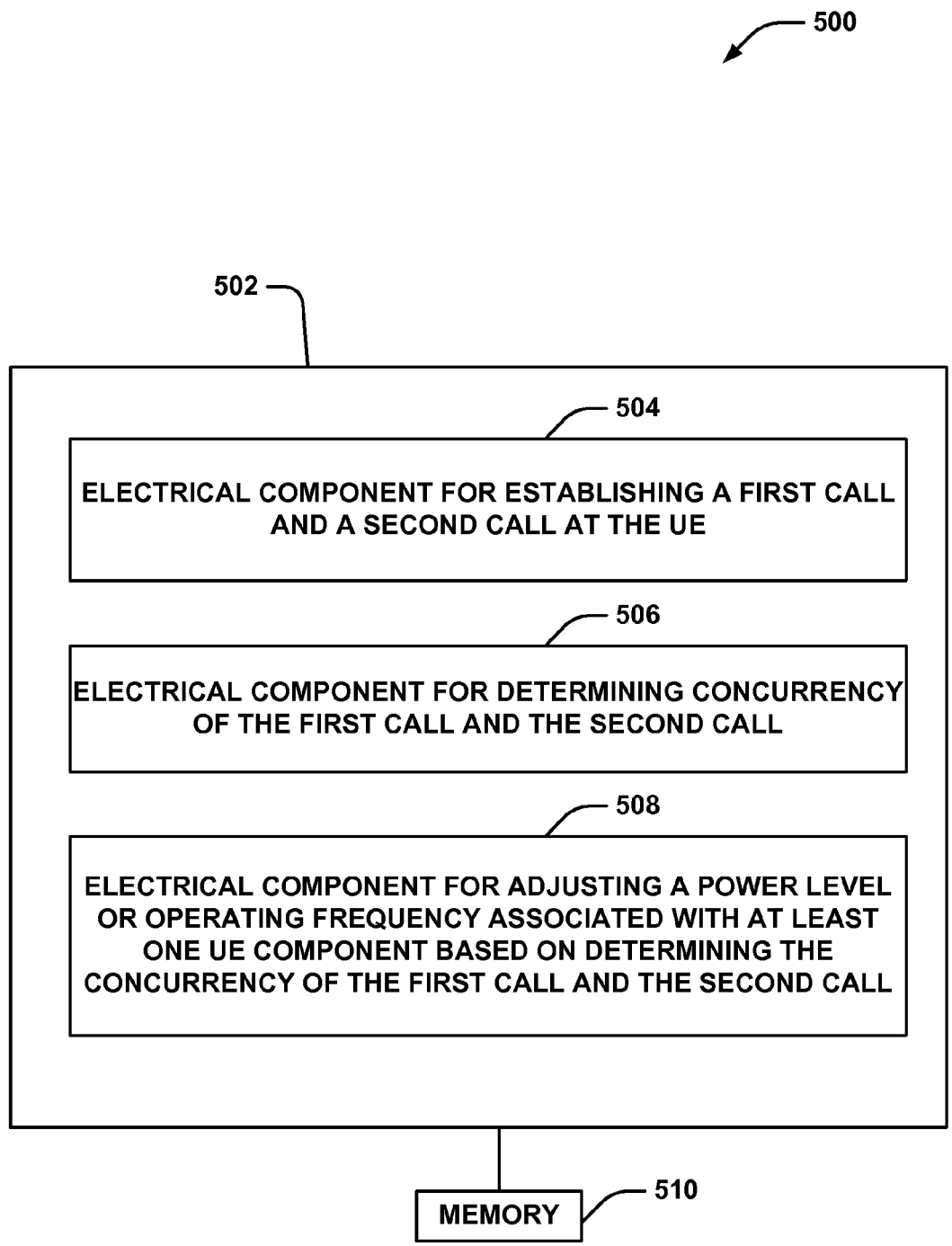
Figure 7:
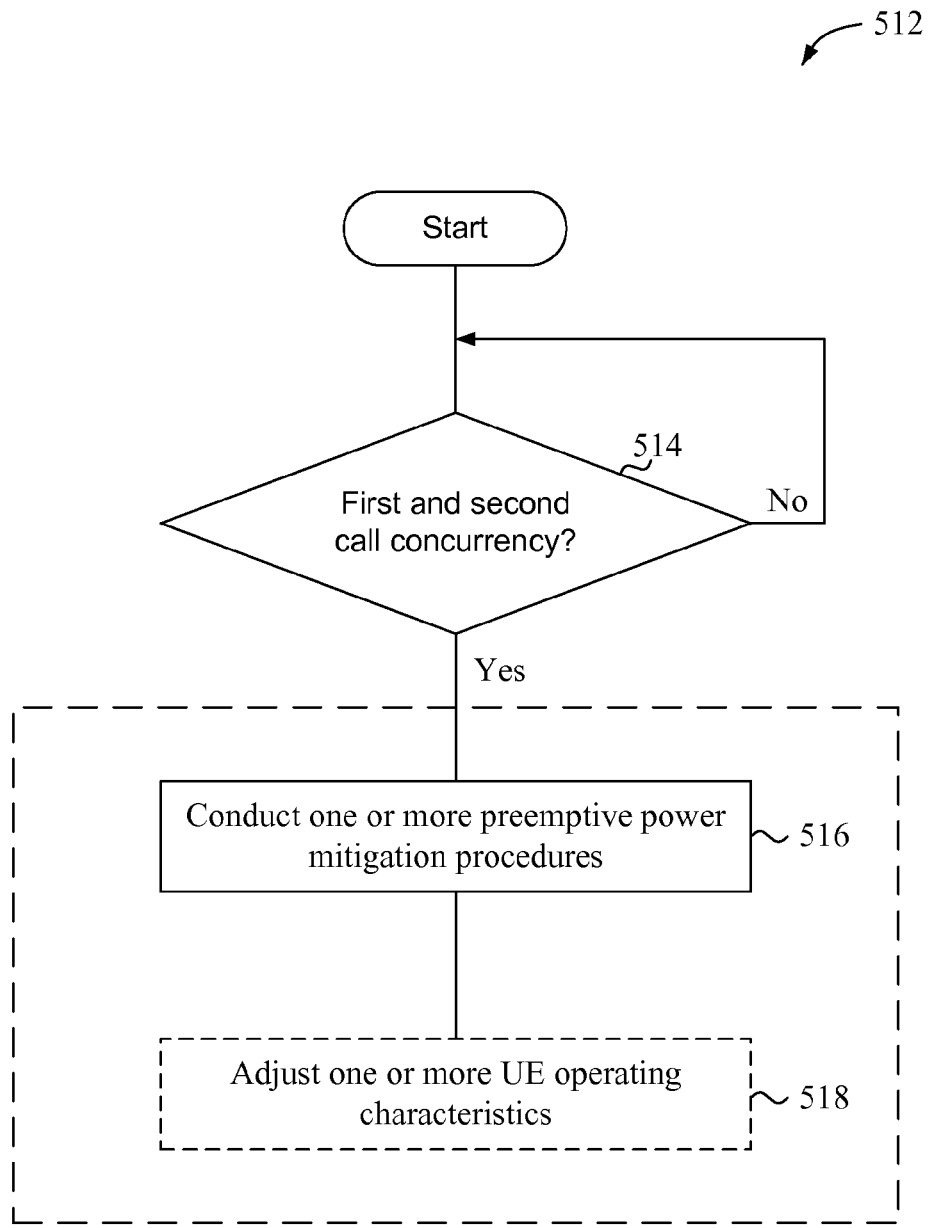
Figure 8:
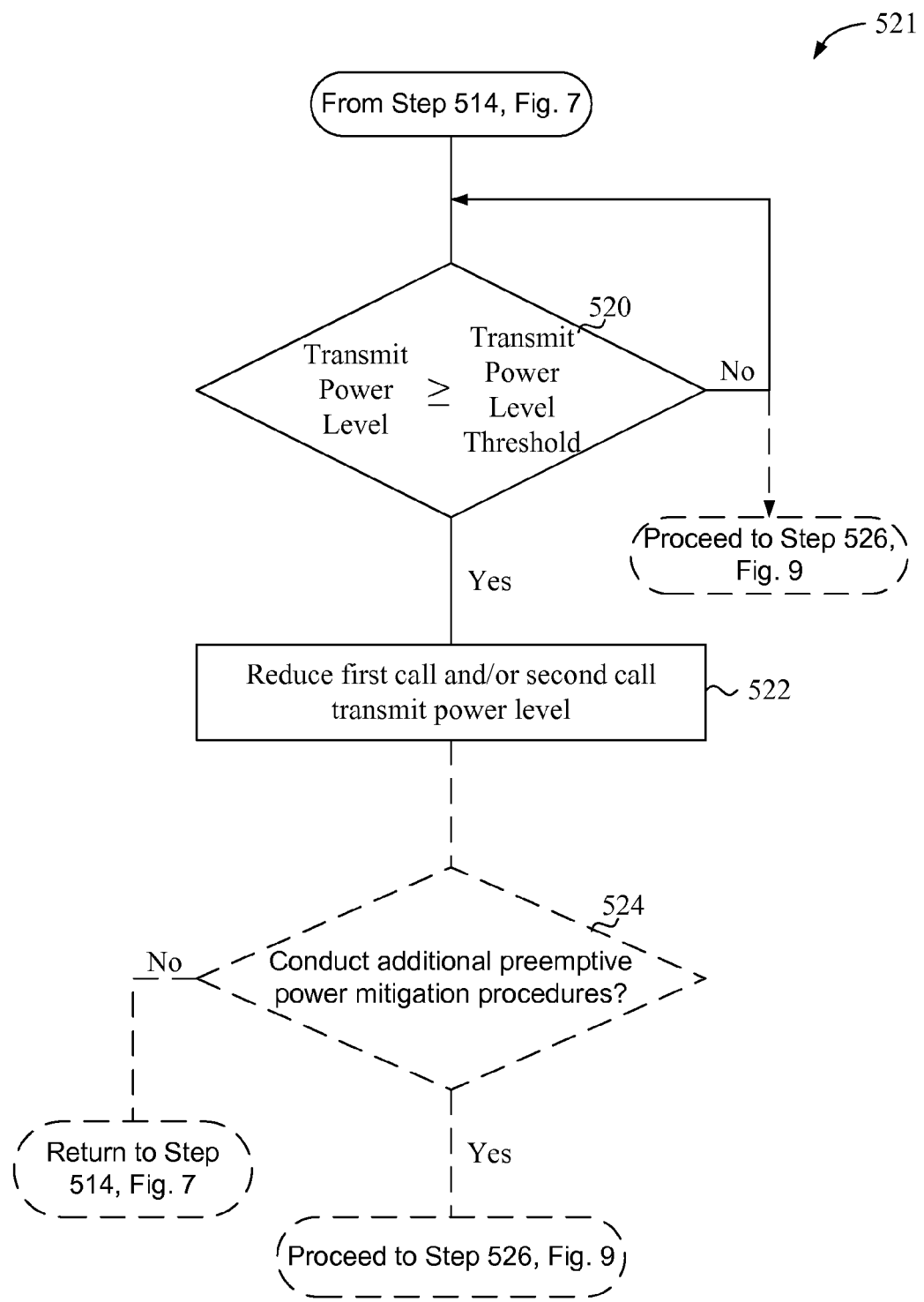
Figure 9:
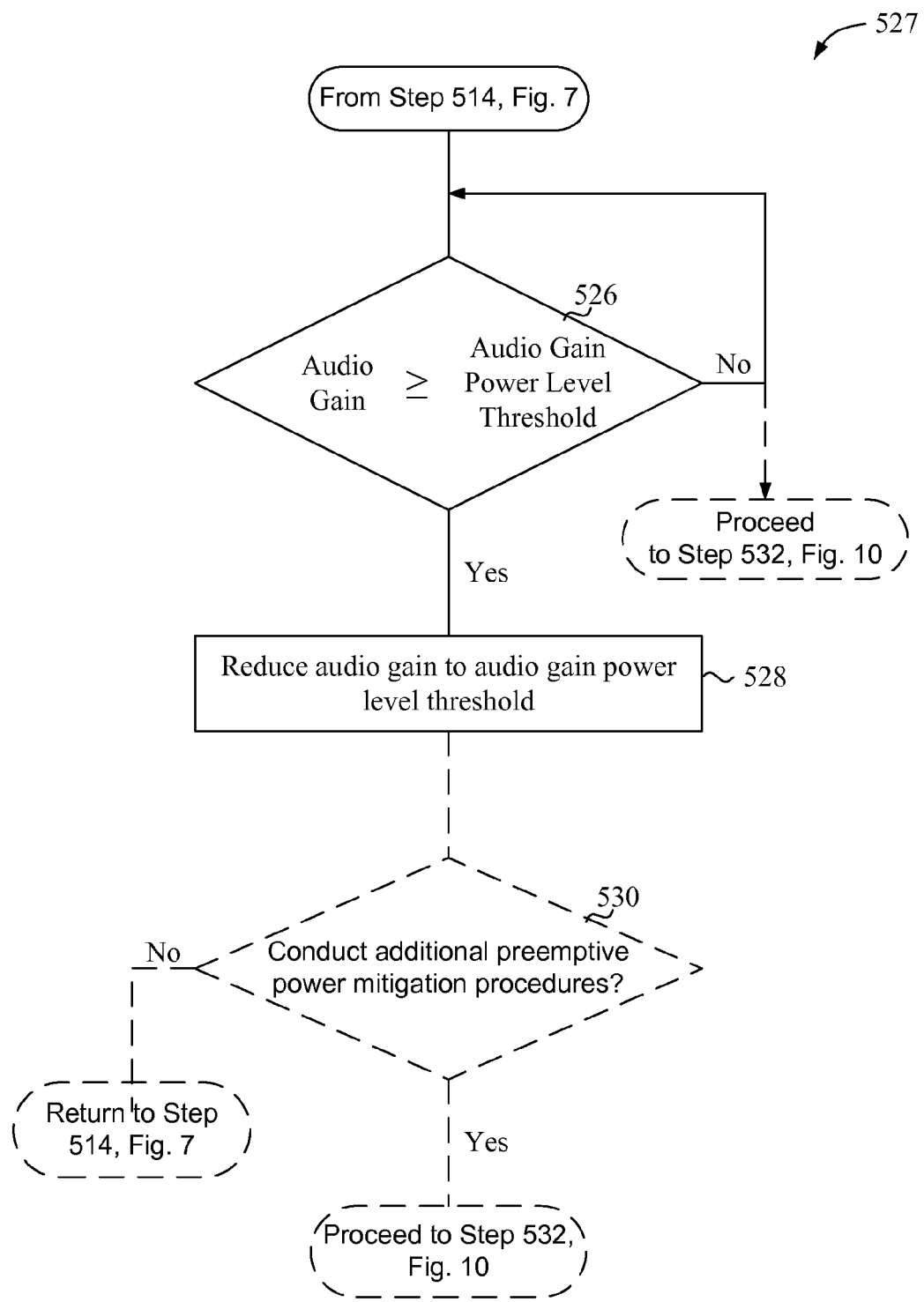
Figure 10:
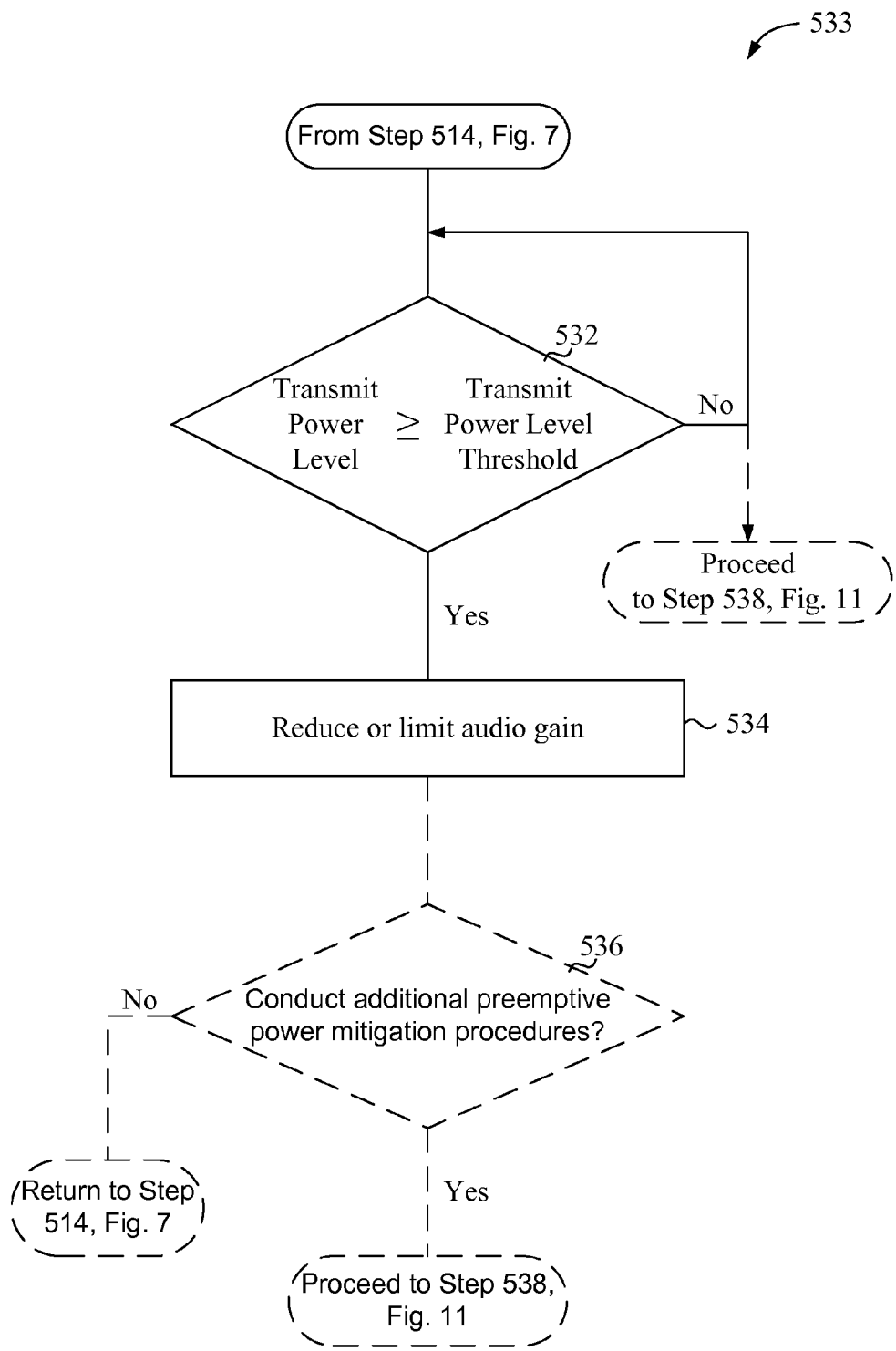
Figure 11:
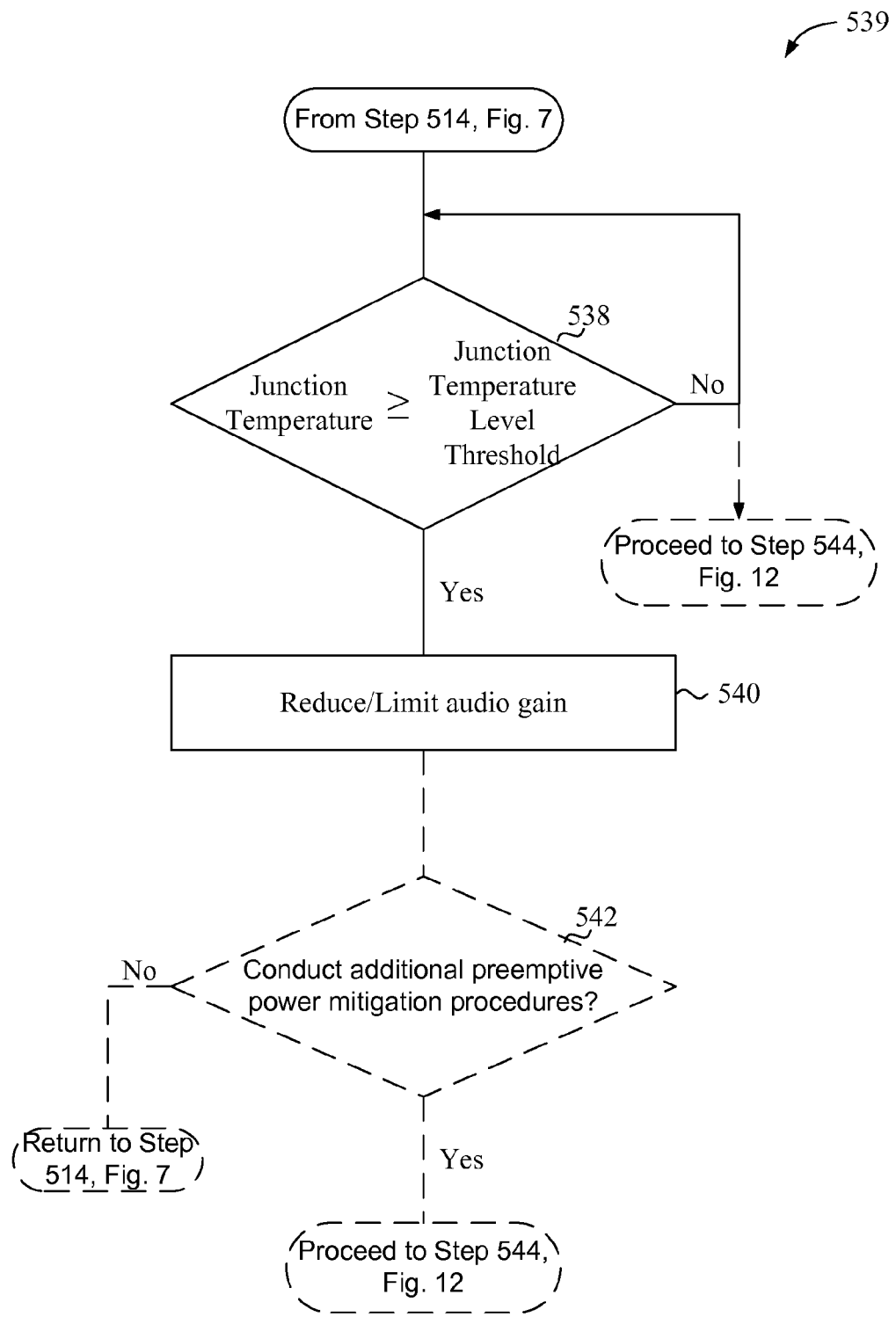
Figure 12:
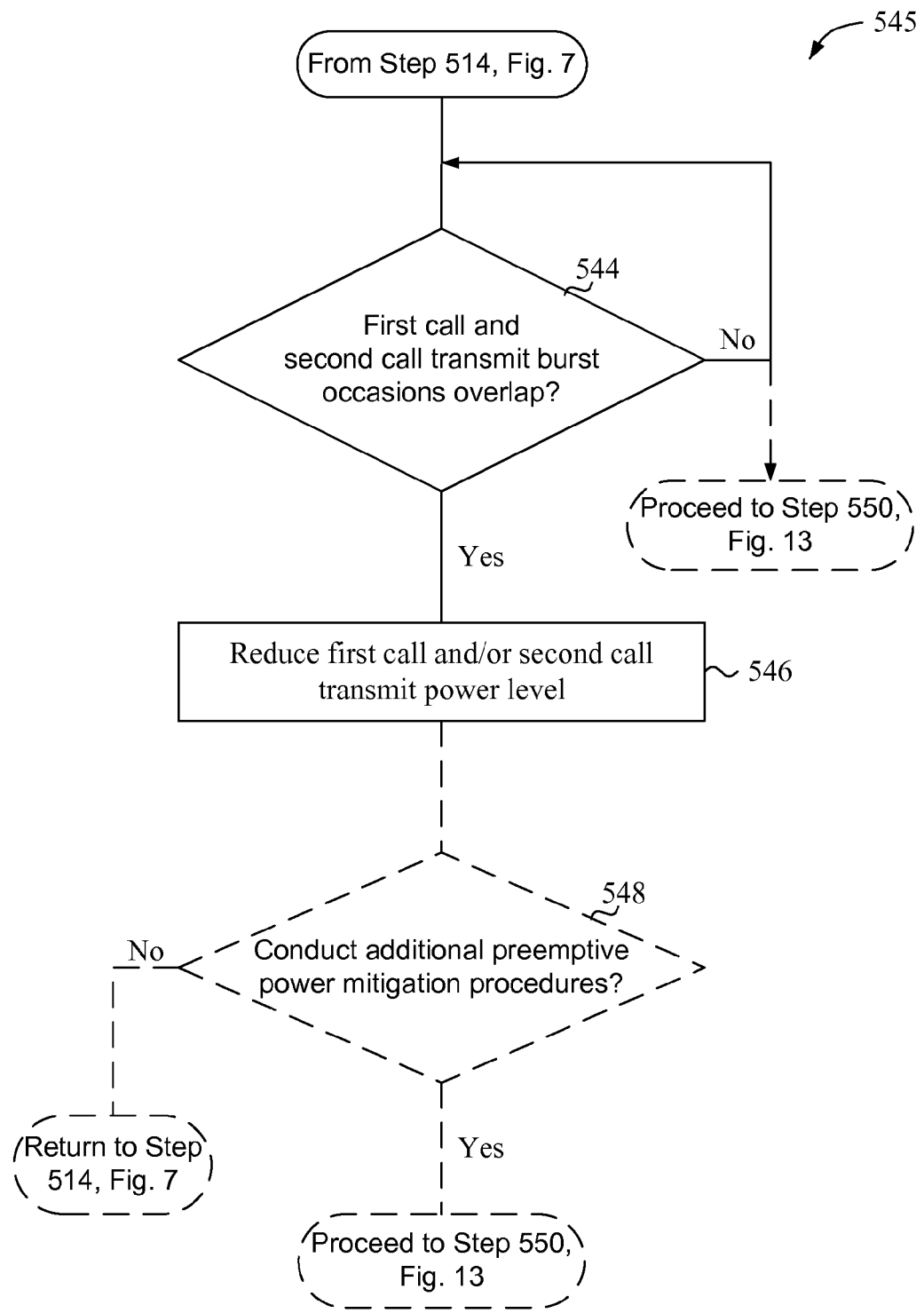
Figure 13:
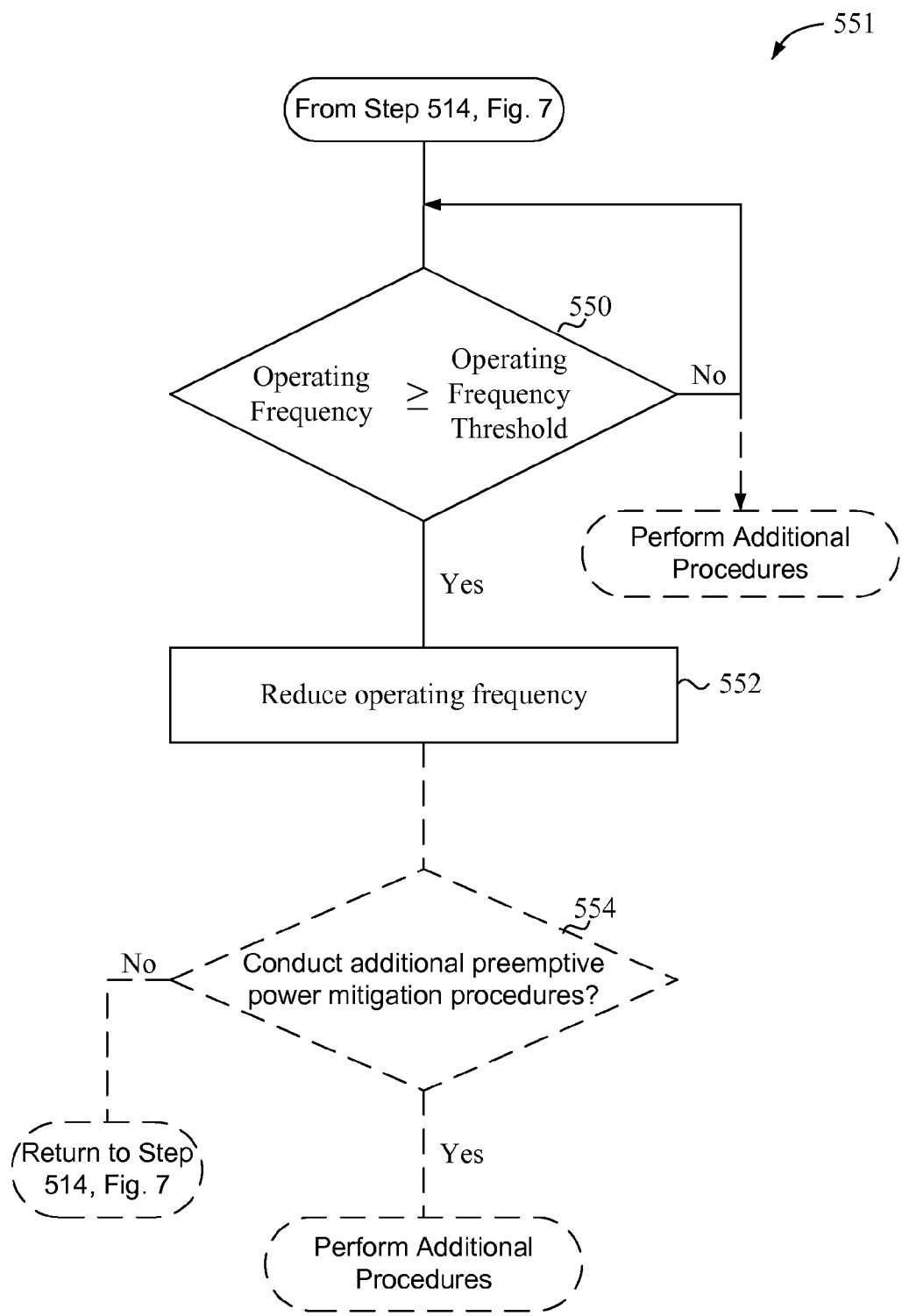
Figure 14:
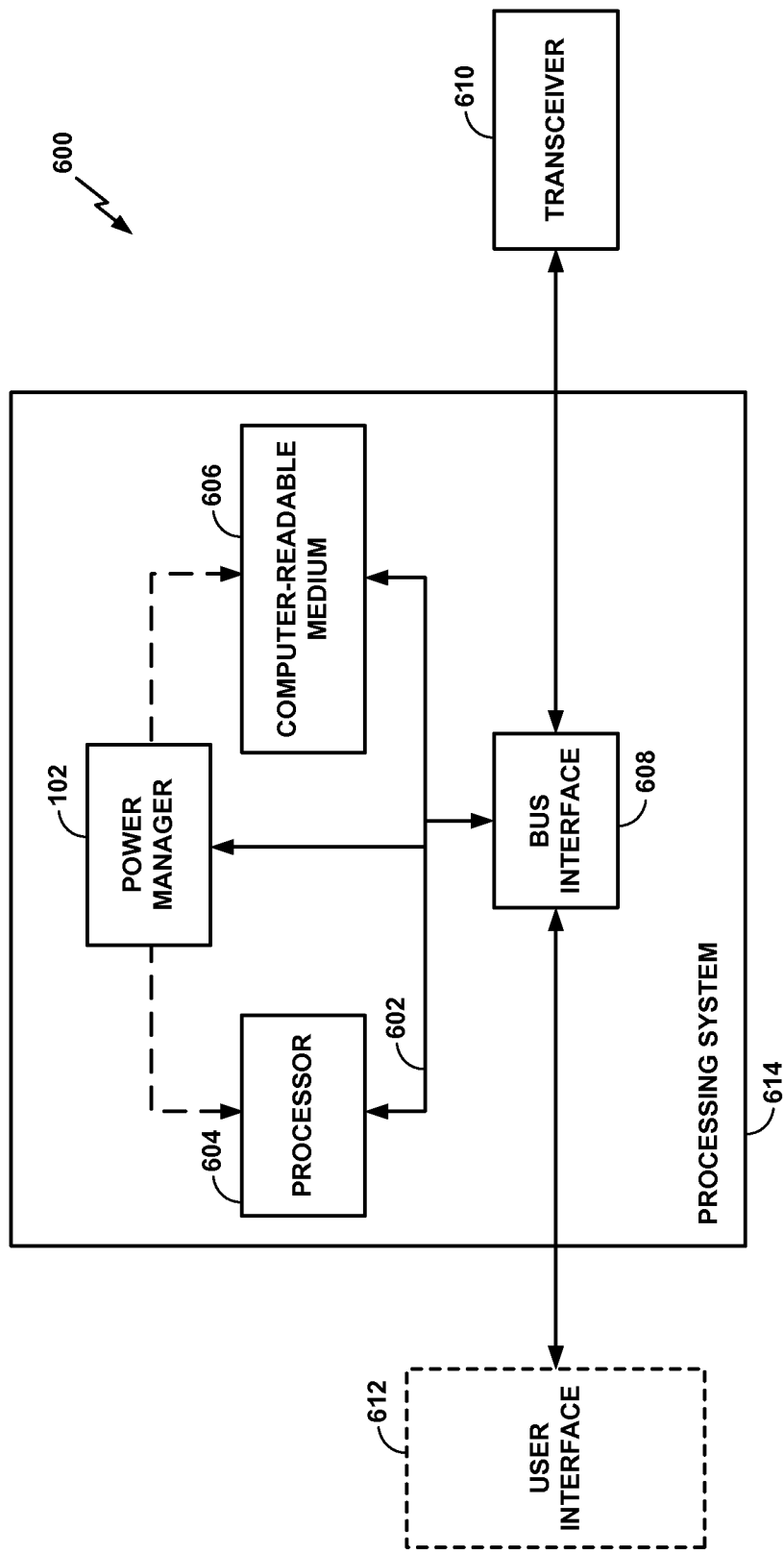
Figure 15:
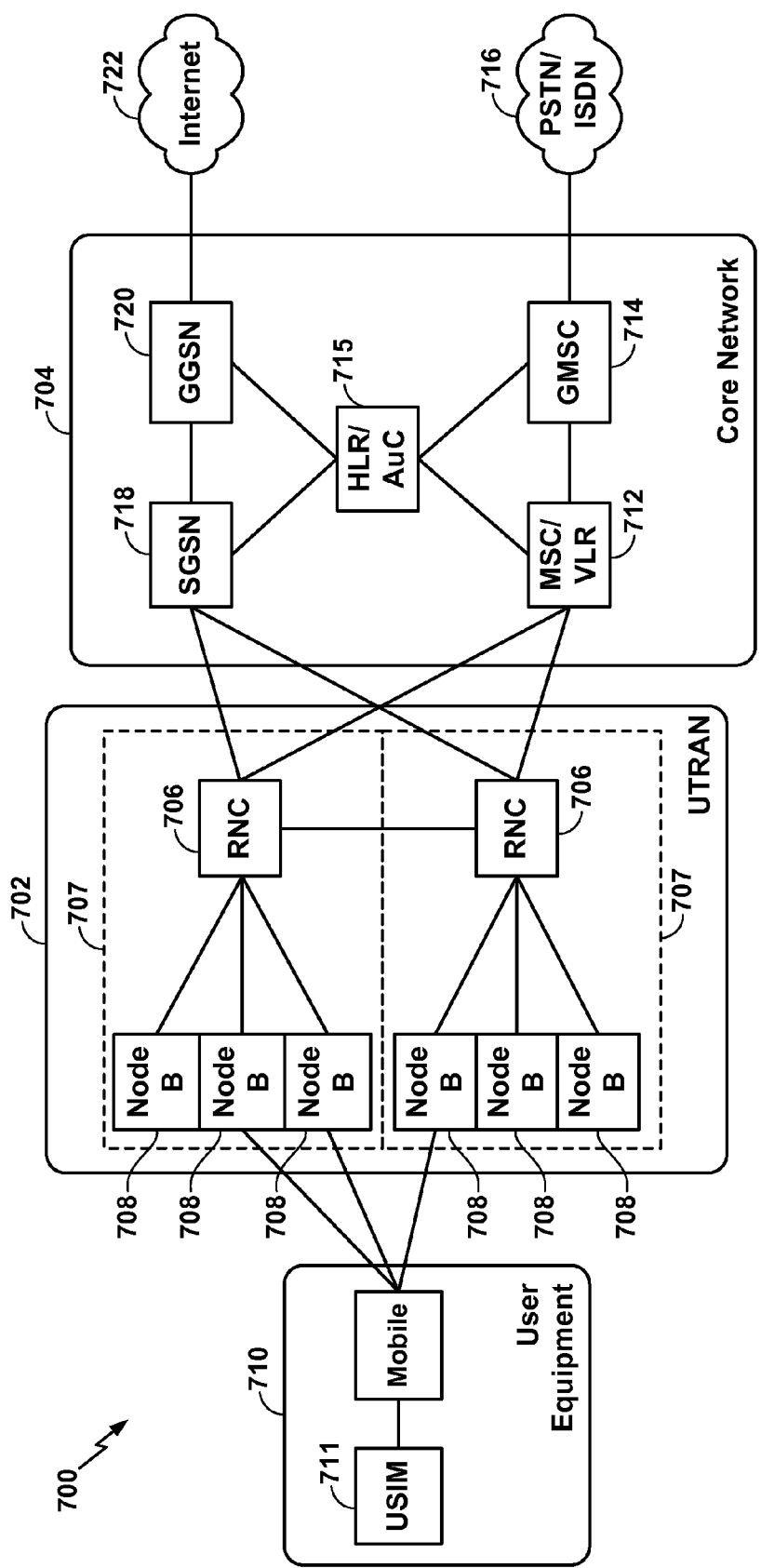
Figure 16:
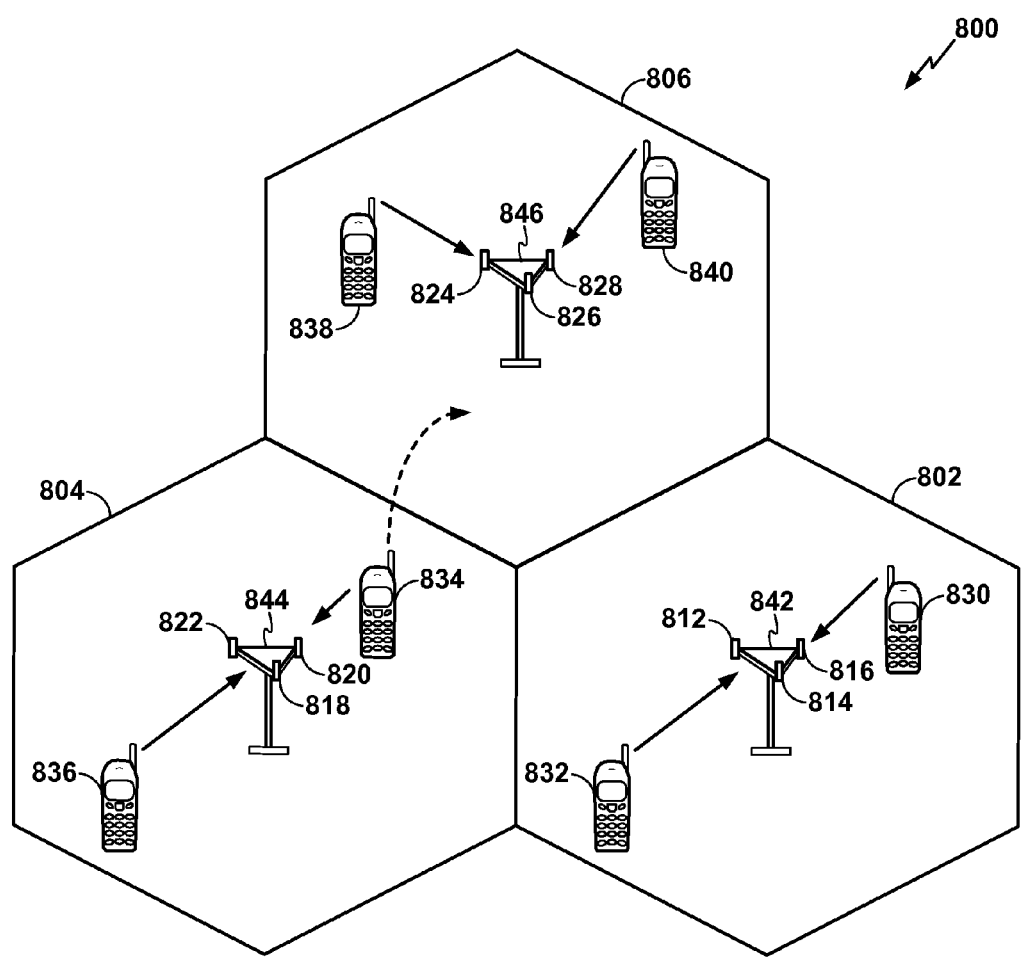
Figure 17:
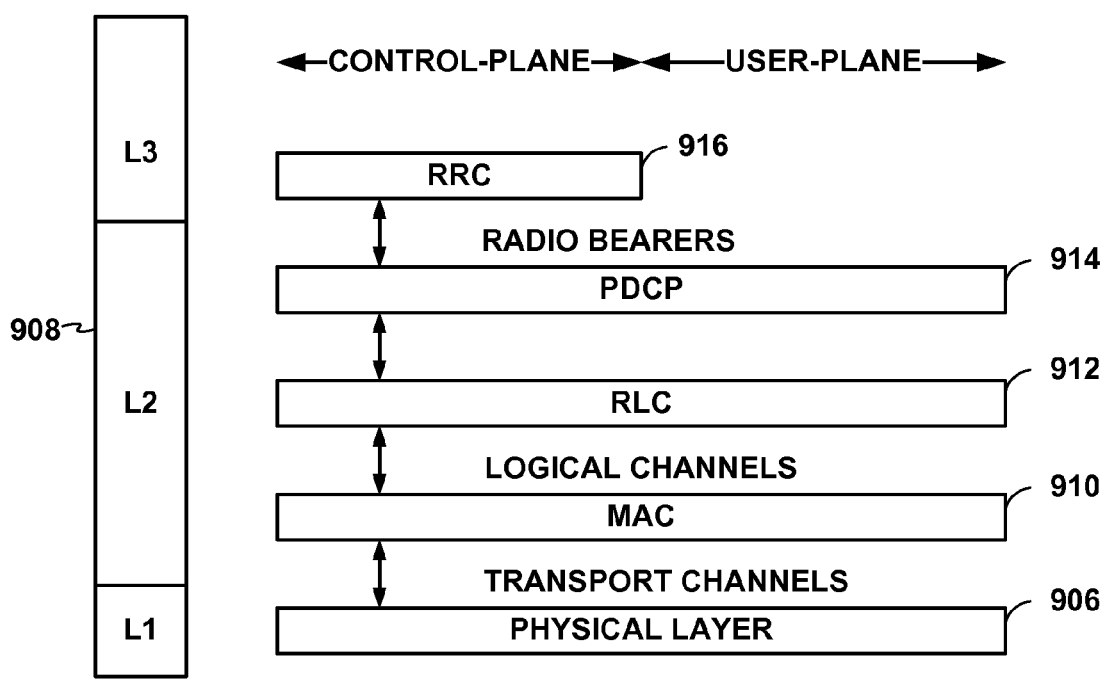

FIG. 1 is a block diagram illustrating an example wireless system of aspects of the present disclosure;

FIG. 2 is a block diagram illustrating an example power manager in aspects of the present disclosure;

FIG. 3 is a block diagram illustrating aspects of a computer device according to the present disclosure;

FIG. 4 is a flow diagram illustrating aspects of a method for improved UE power management according to aspects of the present disclosure;

FIG. 5 is a component diagram illustrating aspects of a logical grouping of electrical components as contemplated by the present disclosure;

FIG. 6 is a flow diagram illustrating aspects of a method for UE power management according to aspects of the present disclosure;

FIG. 7 is a flow diagram illustrating an aspect of a preemptive power mitigation procedure, e.g., according to aspects of the present disclosure;

FIG. 8 is a flow diagram illustrating another aspect of a preemptive power mitigation procedure, e.g., according to aspects of the present disclosure;

FIG. 9 is a flow diagram illustrating a further aspect of a preemptive power mitigation procedure, e.g., according to aspects of the present disclosure;

FIG. 10 is a flow diagram illustrating an additional aspect of a preemptive power mitigation procedure, e.g., according to aspects of the present disclosure;

FIG. 11 is a flow diagram illustrating additional aspects of a preemptive power mitigation procedure, e.g., according to aspects of the present disclosure;

FIG. 12 is a flow diagram illustrating additional aspects of a preemptive power mitigation procedure, e.g., according to aspects of the present disclosure;

FIG. 13 is a block diagram illustrating an example of a hardware implementation for an apparatus employing a processing system including an aspect of the user equipment described herein;

FIG. 14 is a block diagram conceptually illustrating an example of a telecommunications system including aspects of the user equipment described herein;

FIG. 15 is a conceptual diagram illustrating an example of an access network including aspects of the user equipment described herein;

FIG. 16 is a conceptual diagram illustrating an example of a radio protocol architecture for the user and control plane that may be utilized by the user equipment described herein (e.g., UE of FIG. 1); and FIG. 17 is a block diagram conceptually illustrating an example of a NodeB in communication with a UE in a telecommunications system, e.g., the user equipment of FIG. 1.

Figure 18:
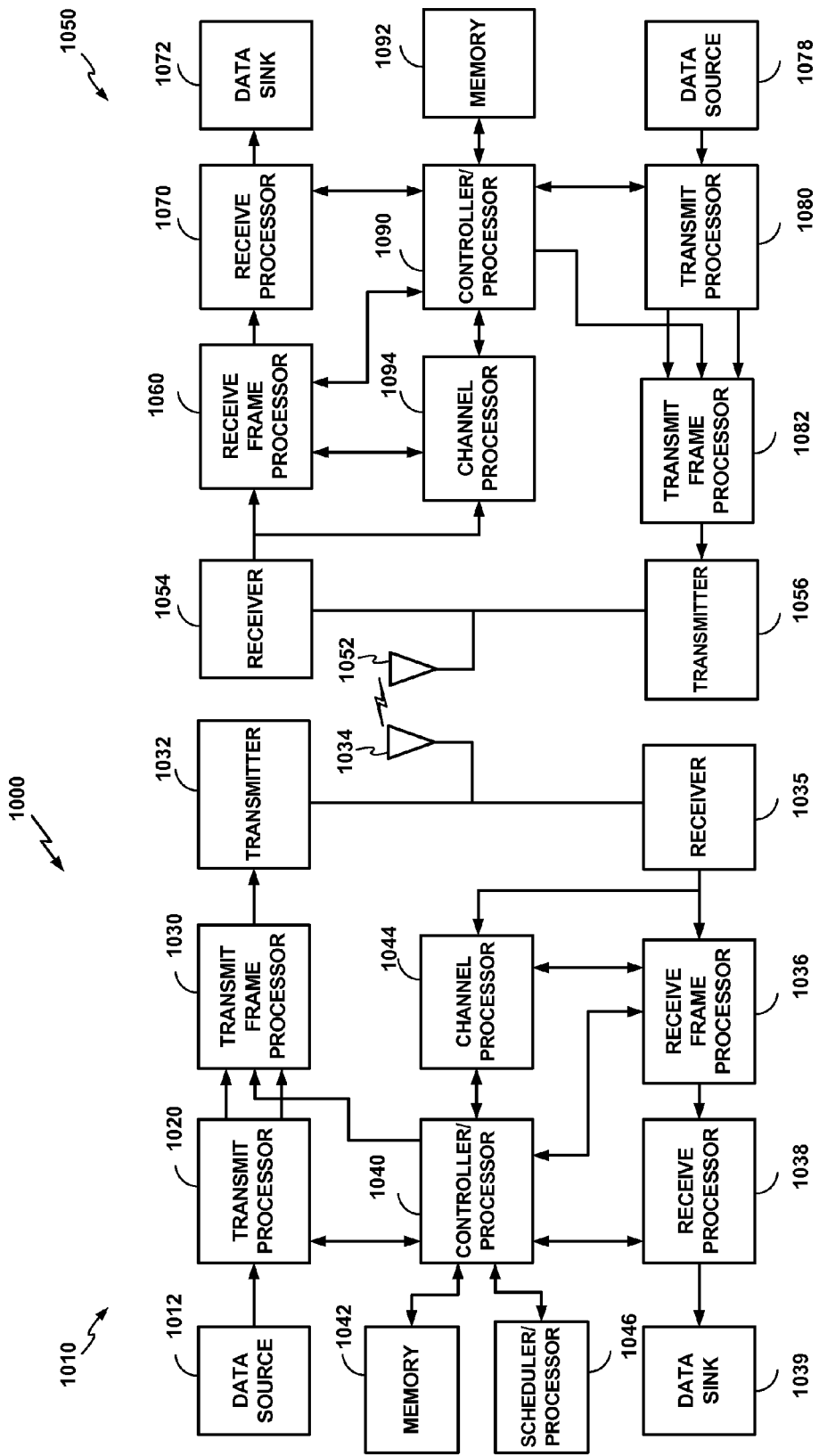

FIG. 18 is a block diagram of a NodeB 1010 in Communication with a UE 1050, Where the NodeB 1010 may be the NodeB 708 in FIG. 15, and the UE 1050 may be UE 600 of FIG. 14 or UE 12 of FIG. 1.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to power management in wireless communication devices. For instance, potential issues may arise during operation of wireless communication devices (e.g., UEs) utilizing DSDA features. Specifically, in some DSDA devices (e.g., DSDA UEs), sudden power degradations may result due to various factors, some of which may have detrimental UE operational effects. For example, one non-limiting scenario which may result in sudden power degradation may include when a primary call of the active calls is a voice call and the user is operating a UE speaker at a high volume, as driving the speaker at high volume requires significant power resources as well. Additionally, another specific and non-limiting example of this scenario may occur when two subscription calls attempt to transmit from a DSDA UE in an overlapping period of time. Each corresponding power amplifier could draw more than two amps from the battery upon each transmit burst. In this example, if one assumes a typical 250 mOhm effective combined internal battery and power management integrated circuit (PMIC) resistance value, a time overlap in these spikes could result in an effective battery output voltage drop in excess of 1V, which would bring even a fully charged battery to the edge of software shut-down. Furthermore, during such a DSDA dual call scenario, adjusting the audio gain associated with a UE speaker being used on a primary voice call may exacerbate the problem, for example, by causing spikes as high as about 500 mA that could last for about 40 μs.

Accordingly, the present disclosure presents methods and apparatuses for power control and management in UEs, such as DSDA UEs, wherein a power control component may regulate power grants to one or more UE components. For example, in an aspect that should not be construed as limiting, the power control component, referred to herein as a power manager, may reduce battery voltage drop (VBat drop) by reducing transmit power levels of one or both concurrent DSDA calls, and/or by reducing audio gain (e.g., speaker volume level), during concurrent DSDA calls. In an alternative or additional aspect, for example, the power control component may take into account a junction temperature to determine leakage current during concurrent DSDA calls, and may reduce battery voltage drop (VBat drop) by reducing transmit power levels of one or both concurrent DSDA calls, and/or by reducing audio gain, when the junction temperature reaches a threshold. Thus, the apparatus and methods of the present aspects provide an efficient and simple mechanism for managing power in DSDA devices.

Specifically, the present apparatus and methods may cover a number of different non-limiting use cases. For example, when the UE is in a concurrent DSDA mode (e.g., when two concurrent calls are in progress), in one aspect, the transmit power level of both calls may be reduced, e.g., to make a DSDA effective combined transmit power level no greater than a combined transmit power level threshold. For instance, in one example, the combined transmit power level threshold may be basically a same level as in a single SIM use case.

In another non-limiting use case, when the UE is in a concurrent DSDA mode, the transmit power level of at least one of the calls may be reduced when such transmit power level meets or exceeds a transmit power level threshold, which may be referred to as a transmit power level threshold condition.

In another non-limiting use case, when the UE is in a concurrent DSDA mode, an audio gain (volume), and hence power usage, of a speaker may be reduced or limited to no more than an audio gain power level threshold.

In another non-limiting use case, when the UE is in a concurrent DSDA mode, an audio gain (volume) may be reduced when, and in some case only when, the transmit power level of at least one of the DSDA calls is above a transmit power level threshold. This transmit power level threshold, for use in reducing audio gain, may be the same as or different from the transmit power level threshold for reducing the transmit power level of one or both of the DSDA calls, as mentioned above.

In another non-limiting use case, when the UE is in a concurrent DSDA mode, the audio gain (volume) and/or transmit power level of at least one of the calls may be reduced when a junction temperature, e.g., the temperature of the actual semiconductor in the UE, meets or exceeds a junction temperature threshold, which may be referred to as a junction temperature threshold condition.

In another non-limiting use case, when the UE is in a concurrent DSDA mode, a transmit power level of both calls may be reduced, e.g., by a static or dynamic back off value, when (and in some cases only when) there is an overlap between the corresponding transmit burst occasions of each call; otherwise, there may not be any reduction in power for both transmit power or audio gain.

Thus, the present apparatus and methods reduce the power level used by one or more components (e.g., transmitter and/or speaker), so as to reduce a battery voltage drop, e.g. such that the maximum battery voltage drop does not exceed (or meet) a threshold for a UE software/hardware reset, a shutdown, or a power-off.

Referring to FIG. 1, in one aspect, a wireless communication system 10 includes a user equipment (UE) 12 for engaging in a plurality of simultaneous voice and/or data calls, which may correspond to one or more network subscriptions. For instance, UE 12 can communicate with a first base station 14 and/or a second base station 16 utilizing the one or more network. In an example, UE 12 can have a first subscription 18 related to first network 20 and second subscription 22 related to the same network, such as first network 20, or to a different network, such as second network 24. For instance, each subscription 18 and 22 may relate to a different account and/or different services on the same network or on different networks. In some aspects, each subscription 18 and 22 optionally may be maintained on a respective first subscriber identity module (SIM) 26 and a second SIM 28. As such, in one aspect, UE 12 may be a multi-SIM, multi-standby device, such as a DSDA (or Dual SIM Dual Standby (DSDS)) device.

Accordingly, UE 12 can at least communicate in first network 20 via a first base station 14 using first subscription 18. Moreover, UE 12 can communicate in second network 24 via first base station 14 and/or via a different base station, such as second base station 16, using second subscription 22. Further, first network 20 and second network 24 can use the same or different radio access technologies (RAT) to facilitate communicating with UEs. By way of example, the RAT may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The RAT may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX). IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization.

In some aspects, UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, first base station 14 and second base station 16 can each be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access via a subscription at the UE 12.

UE 12 can include first radio frequency (RF) resource 104 and/or second RF communication resource 106, which may be configured to manage and/or conduct communication exchange signaling associated with first subscription 18 and/or second subscription 22, respectively. For example, first RF resource 104 and/or second RF communication resource 106 may include and execute communication protocols and/or manage other standards-specific communication procedures using protocol and/or standards-specific instructions and/or subscription-specific configuration information that allow communications with first network 20 and second network 24. Further, first RF resource 104 and/or second RF communication resource 106 may be configured to transmit and/or receive the communication exchange signaling to and/or from one or more base stations or other devices in wireless communication system 10. For example, first RF resource 104 and/or second RF communication resource 106 may include, but are not limited to, one or more of a transmitter, a receiver, a transceiver, a modem, protocol stacks, transmit chain components, and receive chain components. In some aspects, first RF resource 104 and/or second RF communication resource 106 may be dedicated to operate according to the standards and procedures of a single one of first subscription 18 or second subscription 22 at any given time. For instance, although not to be construed as limiting, first RF resource 104 and/or second RF communication resource 106 may be associated with a multi-SIM, multi-active device, such as a DSDA device or a multi-SIM, multi-standby device, such as a DSDS device. In an aspect, first RF resource 104 and/or second RF communication resource 106 may manage multi-network communication to enable mobility of UE 12, e.g. for a handover, and/or to seek to add to or improve communication quality and/or services. In one case, for example, first RF resource 104 and/or second RF communication resource 106 may establish a primary call 34 using first subscription 18 with one network wireless network, for example first network 20, while placing a second call on hold or attempting, acquiring and/or maintaining communication and/or service using second subscription 22 with the same network or with a different network, such as second network 24. In addition, communications between UE 12 and first base station 14 or second base station 16 can occur over logical channels, as described herein, for example. UE 12 can activate the voice and/or data call based on requesting call establishment from first base station 14 or 16, receiving a page for an incoming voice and/or data call from first or second base station 14 or 16, etc. Moreover, for example, primary calls 34 and/or 35 can be a voice and/or data call (e.g., voice over internet protocol (VoIP) or similar technologies) where the first network 20 or second network 24 is a packet-switched (PS) network, a voice call where first network 20 or second network 24 is a circuit-switched (CS) network, and/or the like.

According to an example, UE 12 can establish primary call 34 over first network 20, related to first subscription 18, via first base station 14 while concurrently establishing or conducting an ongoing primary call 35 over second network 24, related to second subscription 22, via second base station 16. In some examples, the UE 12 may prioritize one subscription over the other, such that where two active calls are ongoing or being established, one of the calls is a primary call and the other is a secondary call. In an aspect, the primary call may receive hardware (e.g., speaker 110 and/or microphone and/or a display) and/or power priority over the secondary call. In addition, speaker 110 may have an associated power driving circuit or controller configured to adjust or otherwise control call volume where the primary (or secondary) call is an active voice call.

Furthermore, UE 12 may include a power manager 102, which may be configured to manage or otherwise monitor UE 12 power usage and/or allocation. For instance, power manager 102 may reduce allocation of power from battery 108 to one or more components of the UE 12 when UE 12 is operating in a concurrent DSDA mode. In an aspect, for example, concurrent DSDA mode of UE 12 occurs when UE 12 is operating with two concurrent calls, e.g., call 34 and call 35. Further, for example, the components of UE 12 that may be controlled by power manager 102 include, but are not limited to, first RF communication resource 104, second RF communication resource 106, speaker 110, and/or one or more further components 114, such as any typical component on a mobile wireless device operated with power from battery 108. For instance, further component 114 may include one or more functional components of UE 12 that may utilize and request battery power—such as, but not limited to, one or more of a processor, a display, an application, a camera, and a vibration or rotating unbalance component. In an aspect, any of these components may be using or may request a certain amount of power, which power manager 102 may allocate to the requesting component(s) based on whether UE 12 is in concurrent DSDA mode. Further, in some aspects, battery 108 may be any power source and/or supply facilitating UE 12 operation. In some DSDA mode cases, for example, power manager 102 may reduce a transmit power level of one or both calls, and in some instances may base the reduction on whether a given call is above a transmit call power level threshold or on whether transmission bursts of the calls overlap. In alternative or additional DSDA mode cases, power manager 102 may reduce or limit an audio gain (volume) of speaker 110, and hence power usage, and in some instances may base the reduction of the audio gain (volume) on whether at least one of the calls is above a transmit call power level threshold. In an alternate or additional DSDA mode case, power manager 102 may reduce power to the component(s), e.g. reduce transmit power level for either call 34 and/or call 35 and/or audio gain (volume) of speaker 110, based on whether a junction temperature value meets or exceeds a junction temperature threshold. As used herein, the term "junction temperature threshold" may refer to a highest temperature of the semiconductor in an electronic device or an associated integrated circuit (IC), a portion or component of the device or IC. For example, the junction temperature threshold may include, or may be based on, the maximum temperature of the actual semiconductor as may be specified in a datasheet for the semiconductor. For instance, in an aspect, power manager 102 may receive one or more junction temperature values from one or more junction temperature sensors 112, and compare these values to one or more corresponding junction temperature thresholds, and reduce power to one or more components when one or more junction temperature thresholds are met or exceeded. Thus, power manager 102 provides a pre-emptive mechanism and/or one or more procedures for limiting battery voltage drop, or VBat drop, during DSDA mode or a concurrent call mode of UE 12, in order to mitigate current spikes aggregation.

Referring to FIG. 2, an aspect of power manager 102 including various components and/or subcomponents, which may alone or in conjunction therewith, be configured to manage or otherwise monitor UE power usage and/or allocation. In this aspect, power manager 102 may include a power resource allocation manager 202, which may be configured to receive one or more power resource requests from one or more components in UE 12. Furthermore, power resource allocation manager 202 may allocate the power resources of the UE battery 108 (FIG. 1) based on one or more of a myriad of possible factors contemplated by the present disclosure.

In an aspect, power resource allocation manager 202 may be triggered to operate based on execution of a concurrent call determining component 204. For example, concurrent call determining component 204 may include hardware, software, firmware, specially-programmed algorithms, or combinations thereof, to detect when UE 12 (FIG. 1) is operating in concurrent DSDA mode, e.g. when UE 12 has two concurrent calls such as call 34 and call 35. For instance, concurrent call determining component 204 may monitor protocol stacks and/or logical or physical communication interfaces, or combinations thereof, to determine existence of two concurrent calls, and then send a notifying message to power resource allocation manager 202 when such concurrent calls are detected.

As such, when resource allocation manager 202 is notified by concurrent call determining component 204 of concurrent calls or concurrent DSDA mode of operation of UE 12, then power resource allocation manager 202 may execute hardware, software, firmware, specially-programmed algorithms, or combinations thereof, to reduce power to one or more components of UE 12. For example, in some cases, power resource allocation manager 202 may reduce power to one or more components strictly on the basis of the detected DSDA mode. Further, for example, in another case, power resource allocation manager 202 may reduce power to one or more components when a measured power level of that component, or of another concurrently operating component, meets or exceeds a corresponding power level threshold. Additionally, in another case, power resource allocation manager 202 may reduce power to one or more components when the DSDA mode is detected and when one or more measured junction temperature values meets or exceeds a corresponding junction temperature level threshold. Finally, in another case, power resource allocation manager 202 may reduce power to one or more components when there is an overlap in transmission bursts of the concurrent calls. It should be noted that the above cases may operate independently, or in one or more combinations.

For instance, in an aspect, power resource allocation manager 202 may reduce power to first RF communication resource 104 and/or second RF communication resource 106 and/or speaker 110 (e.g., reduce or limit audio gain) and/or further component 114 strictly on the basis of the detected DSDA mode. In this case, power resource allocation manager 202 may include one or more power reduction levels 215 and/or one or more power level thresholds 217. Each power reduction level 215 may be a static value or a dynamic value for use in a stepwise reduction in power allocation corresponding to each component. Further, each power level threshold 217 may be a static value or a dynamic value for use as a maximum or minimum allocation of power corresponding to each component. In each power reduction level 215 and/or each power level threshold 217, the static value may be a predetermined value configured to avoid current spikes aggregation, while the dynamic value may also avoid current spikes aggregation, but may vary depending upon power usage, power consuming components, which component is experiencing an increase in power usage, etc. As such, when the DSDA mode is detected, power resource allocation manager 202 may reduce or limit power to a respective component based on a corresponding power reduction level 215 and/or based on a corresponding power level threshold 217. In other words, power resource allocation manager 202 may reduce power to first RF communication resource 104 and/or second RF communication resource 106 and/or speaker 110 (e.g., reduce or limit audio gain) and/or further component 114, such as by reducing or limiting power according to a corresponding power reduction levels 215 or a corresponding power level threshold 217.

In addition, power resource allocation manager 202 may base power resource allocation on component prioritization, which may be determined by a component prioritization component 206. Component prioritization component 206 may include hardware, software, firmware, specially-programmed algorithms, or combinations thereof, in order to identify which component, or any number of components, to rank or otherwise order relative to applying a power reduction. For example, in some aspects, where one or more voice and/or data calls, e.g. call 34 and call 35 (FIG. 1) are active in a DSDA device, a component prioritization component 206 may determine which subscription's call has been configured as a primary subscription and which subscriptions are secondary subscriptions. Based on this determination, component prioritization component 206 may prioritize components associated with the primary subscription (and therefore the primary active call), e.g. RF communication resources, over components or functions associated with one or more secondary subscriptions or active calls. In addition, component prioritization component 206 may be configured with a component prioritization list 208, from which it may determine a prioritization order for UE components requiring power. In any case, in one example, priority may be defined as relatively higher for RF communication resources serving a voice call in which the user is actively conversing, while priority could be defined as relatively lower for RF communication resources serving a download/upload occurring concurrently with the active voice call. Therefore, for such a lower priority data download/upload, the power allocation resource manager 202 may back off the lower priority call's power level at the expense of lower data rate while maintaining good quality of service on the active voice call, which, in some examples, may have a high associated speaker audio volume. In another aspect, component prioritization component 206 may determine component priority based on user preference, network preference, network provider preference, manufacturer preference, or the like. It should be noted that while the examples discussed herein relate to RF communication resources, component prioritization component 206 may generate a relative priority for all components, or subsets thereof, utilizing power on UE 12.

Further, power resource allocation manager 202 may base power resource allocation on existing power levels relative to thresholds, which may be determined by a threshold condition determining component 209. Threshold condition determining component 209 may include hardware, software, firmware, specially-programmed algorithms, or combinations thereof, in order to measure a power usage level of one or more components of UE 12, and or a junction temperature, and compare each such usage or temperatures, or any combination of such usages or temperatures, to one or more thresholds, such as power level threshold 217 or a junction temperature threshold 219. For example, referring to FIG. 1, threshold condition determining component 209 may measure a transmit power level of a first call and/or a second call, e.g. call 34 or call 35, based on respective monitoring of transmit power levels or communicating with first RF communication resources 104 and/or second RF communication resources 106. Then, threshold condition determining component 209 may compare one or more measured power levels with one or more power level thresholds 217, and determine the power level threshold condition to be met when the measured power level meets or exceeds the corresponding threshold. Further, for example, referring to FIG. 1, threshold condition determining component 209 may perform similar measuring of an audio gain (volume), which corresponds to power usage, based on monitoring power circuitry or communicating with speaker 110, and comparing such audio gain (volume), or a relative power level metric corresponding to such audio gain, to a corresponding power level threshold 217. Likewise, for example, referring to FIG. 1, threshold condition determining component 209 may measure power usage of one or more further components 114 by monitoring corresponding power circuitry or communicating with such further components 114, and perform threshold determinations in a similar manner. In another example, referring to FIGS. 1 and 2, threshold condition determining component 209 may measure or otherwise obtain one or more junction temperatures, and compare such junction temperatures to one or more corresponding junction temperature thresholds 219 to determine when a junction temperature threshold condition exists. When threshold condition determining component 209 determines existence of a threshold condition, e.g., power level threshold 217 and/or junction temperature threshold 219, then threshold condition determining component 209 notifies power allocation resource manager 202. As a result, power allocation resource manager 202 may reduce power allocated to one or more components, as discussed herein.

In one case of operation of power allocation resource manager 202 in combination with threshold condition determining component 209, for example, power allocation resource manager 202 may reduce a transmit power level of one of the DSDA mode calls, or may reduce an audio gain (volume) of speaker 110, when the one call has a measured power level that meets or exceeds a power level threshold 217. In another example, power allocation resource manager 202 may reduce a transmit power level of one or both of the DSDA mode calls, or may reduce an audio gain (volume) of speaker 110, when one or more measured or obtained junction temperatures meets or exceeds a junction temperature level threshold 219.

In an additional or alternative aspect, power allocation resource manager 202 may also allocate power, in one non-limiting example, during the DSDA mode based on a configured operational priority to keep a maximum number of components (or subset of critical components) functioning—even if that means functioning poorly. As such, in an aspect, power manager 102 may include a functioning power level managing component 210, which may include hardware, software, firmware, specially-programmed algorithms, or combinations thereof, configured to determine or otherwise obtain and apply a functioning power level for each UE component. In an aspect, the functioning power level associated with a UE component may comprise a power level at which the UE component can remain functional. In some aspects, this functioning power level may correspond to a transmission power, such as the transmission power of a secondary call. In such an aspect, the functioning power level value may correspond to the power level value such that if the secondary call transmission power level were altered to equal the functioning power level and the primary call transmission power level was granted at a requested power level, the UE would not enter a critical power level threshold condition (or reach a junction temperature threshold condition). For purposes of the present disclosure, the term "critical power level threshold condition" may refer to a level of operating power corresponding to a minimum power output level or threshold for operation of a set of base or critical components (e.g. transceiver, user interface, or any other manufacturer or operator defined components) of UE 12. Furthermore, power allocation resource manager 202 may be configured to reduce the one or more secondary call transmission power level to the functioning power level. Such operation will help ensure that the UE is able to reliably communicate via a primary call and contemporaneously hold a connection on a secondary call, and/or ensure that other devices, such as a set of critical components or any other subset of UE components, are operating at a functioning power level.

In an additional aspect, the power manager 102 may include a power scheduling component 212, which may include hardware, software, firmware, specially-programmed algorithms, or combinations thereof, configured to store, manage, and/or compare message transmission scheduling, including transmission scheduling, associated with one or more of a first and second subscription, shut-off period scheduling, or any known processing schedules associated with any other UE component associated with a DSDA (or DSDS) UE. In an aspect, during DSDA mode, power scheduling component 212 may be configured to compare the transmission schedules of a first and second subscription and reduce a transmit power level of one or both calls when there is an overlap between scheduled transmissions, e.g. transmission bursts. In other aspects, beyond comparing transmission schedules, power scheduling component 212 may also compare shut-off period schedules, and/or one or more processing schedules to determine whether any potential voltage supply spikes may occur and cause a related VBat drop problem in the future and/or whether one or more UE components will be shut off during a period where signaling associated with power control will be communicated. Power scheduling component 212 may estimate the probability of these spikes by summing current levels required for future-in-time scheduled transmissions or process execution at a particular instant or time slot and determine whether the UE will experience VBat drop or reach a critical power level threshold condition (or a junction temperature threshold condition) based on the current scheduling information. Based on such a future estimation, power scheduling component 212 and/or power resource allocation manager 202 may alter the transmission schedule or shut-off period schedule of one or more of a transmission or process execution to help the UE avoid VBat drop and/or reach a critical power level threshold. Additionally, power manager 102 may optionally include querying component 220, which may be configured to query one or more components of a UE for power level values used in subsequent power usage and/or allocation determinations. Further aspects of the querying component 220 will be discussed below with respect to FIG. 3.

In other aspects, power manager 102 may optionally include primary call determiner 221, which may be configured to determine whether a first call (e.g., call 34, FIG. 1) or second call (e.g., call 35, FIG. 1) comprises or is identified as a primary call, and provide indication to power allocation resource manager 202 to adjust the power level based at least in part on such determination. In some non-limiting aspects, the primary call may be the call associated with the primary SIM (e.g., one of first SIM 26 and second SIM 28), may be the call originating first in a series of calls, or may be the call on which the user is actively conversing while the other call is on hold. A primary SIM may, in some non-limiting cases, be considered the SIM specified by a user to be the primary phone number. Further, in other non-limiting cases, the primary SIM may be identified or otherwise determined to be one (e.g., of two or more SIMs) having priority based on air interface technology used (e.g., per user's preferences in terms of monthly expenses and/or quality) as compared to the other air interface technology on the other SIM through the same or different carrier. Accordingly, power manager 102 may determine a primary call associated with a primary SIM (e.g., one of first SIM 26 and second SIM 28) versus a secondary call associated with a secondary SIM (e.g., the other of first SIM 26 and second SIM 28) based on the foregoing examples and/or pre-determined call identification procedures.

Referring to FIG. 3, in an aspect, querying component 220 includes various components and/or subcomponents configured to query one or more components of a UE for power level values used in subsequent power usage and/or allocation determinations. For example, querying component 220 may include power level value component 222, which may be configured to query each of one or more UE components (e.g., UE components of FIG. 1) for power level values. Further, power level value component 222 may store one or more power level values corresponding to the queried UE components. The stored power level values corresponding to the queried components may be provided to (e.g., upon request or automatically) arithmetic component 224, which may be configured to perform one or more arithmetic operations (e.g., addition) using each power level value to obtain an aggregated power level associated with the UE 12. Moreover, arithmetic component 224 may weigh each power level value differently based on various usage factors. For example, arithmetic component 224 may assign weighting factors that may affect the aggregated power level value 226 such that certain UE 12 components may carry a higher UE 12 effect value and/or power level usage/allocation priority (e.g., based on the component prioritization list in FIG. 2). Subsequently, aggregated power level value 226 may be provided to and/or obtained by comparator 228, which may be configured to compare the aggregated power level value 226 to a critical power level threshold 230. If the aggregated power level is greater than or equal to critical power level threshold 230, then comparator 228 may determine that a critical power level condition 232 exits. A critical power level condition 232 may represent a state in which UE 12 may be on the verge of power degradation. In other words, critical power level condition 232 may represent a predication of or expected VBat drop. Accordingly, critical power level condition 232 may be provided to, or obtained by power allocation resource manager 202, which may be configured to then adjust the power level associated with at least one UE 12 component to preempt power degradation and/or VBat drop.

Referring to FIG. 4, in one aspect, UE 12 (FIG. 1) may be represented by a specially programmed or configured computer device 300. Computer device 300 includes a processor 302 for carrying out processing functions associated with one or more of components and functions described herein. Processor 302 can include a single or multiple set of processors or multi-core processors. Moreover, processor 302 can be implemented as an integrated processing system and/or a distributed processing system.

Computer device 300 further includes a memory 304, such as for storing data used herein and/or local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications component 306 that provides for establishing and maintaining communications with one or more parties utilizing hardware, software, and services as described herein. Communications component 306 may carry communications between components on computer device 300, as well as between computer device 300 and external devices, such as devices located across a communications network and/or devices serially or locally connected to computer device 300. For example, communications component 306 may include one or more buses, and may further include transmit chain components and receive chain components associated with a transmitter and receiver, respectively, or a transceiver, operable for interfacing with external devices.

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302 and/or any threshold values.

Computer device 300 may additionally include a user interface component 310 operable to receive inputs from a user of computer device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof.

In a UE (e.g. UE 12 of FIG. 1), computer device 300 may include power manager 102 (FIGS. 1 and 2), such as in specially programmed computer readable instructions or code, firmware, hardware, processor modules, or some combination thereof. The power manager 102 may be in optional communication with one or more components of the computer device 300 to manage or otherwise monitor power usage and/or allocation.

FIG. 5 illustrates an example methodology 400 for improved power management to preemptively avoid VBat drop in mobile devices (e.g. UEs). While, for purposes of simplicity of explanation, the method is shown and described as a series of acts, it is to be understood and appreciated that the method is not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 402, a UE may establish a first call and a second call, wherein the first call is associated with a first subscription and the second call is associated with a second subscription. In an aspect, the calls may comprise a voice call and a data call, two voice calls, or two data calls. In an aspect, the first call may be associated with a first subscription (e.g., first subscription 18, FIG. 1) and the second call associated with a second subscription (e.g., second subscription 22, FIG. 1), and in some instances the first call and the second call may be contemporaneously active, e.g. overlapping transmissions, for at least a portion of each of the first call and the second call. For instance, in aspects described herein, UE 12 may, in conjunction with the first SIM 26 and second SIM 28, execute first RF communication resources 104 and second RF communication resources 106, which may correspond to first subscription 18 and second subscription 22 (FIG. 1), to establish a first call and a second call (e.g., calls 34 and 35, respectively in FIG. 1).

Furthermore, at block 404, the UE may determine concurrency of the first call and the second call. For example, in aspects described herein, power manager 102 may execute concurrent call determining component 204 (FIG. 2) to determine or obtain information of the concurrent operation of two calls or of UE 12 (FIG. 1) operating in DSDA mode. For instance, the concurrency of two calls (e.g., calls 34 and 35, FIG. 1) may be based on the two calls being established or otherwise maintained at the same time.

Additionally, at block 406, the UE may adjust (e.g. at a UE power manager) a power level associated with at least one UE component based on determining the concurrency of the first call and the second call. For example, power manager 102 may execute power allocation resource manager 202 to adjust one or more power levels associated with at least one UE 12 component (FIG. 1) based on determining the concurrency of the first call and the second call (e.g., calls 34 and 35, respectively, FIG. 1). In an aspect that should not be construed as limiting, power manager 102 (FIG. 1) may execute power allocation resource manager 202 to reduce battery voltage drop (VBat drop) by reducing transmit power levels of one or both concurrent DSDA calls, and/or by reducing or limiting audio gain (e.g., speaker volume level), during concurrent DSDA calls. In some case, the reduction may be based on a measured or scheduled transmit power level being above a power level threshold (e.g., power level threshold 217, FIG. 2), or on transmissions for each call being overlapping. In an alternative or additional aspect, for example, the power manager 102 may execute power allocation resource manager 202 (FIG. 2) to take into account a junction temperature to determine leakage current during concurrent DSDA calls, and may reduce battery voltage drop (VBat drop) by reducing transmit power levels of one or both concurrent DSDA calls, and/or by reducing audio gain, when the junction temperature reaches a threshold (e.g., junction temperature threshold 219, FIG. 2). Further, in some cases, the reduction in power may be a stepwise reduction, such as based on a power reduction level value, or a reduction to a given power level threshold, such as a minimum amount of power necessary to maintain operation of a component. Additionally, the reduction in power may be any other reduction described herein.

In additional aspects not shown in FIG. 4, but which may be included in methodology 400 or other methodologies contemplated herein, the UE 12 may further query each of one or more of the at least one UE 12 component for a power level value. For example, as described herein, power manager 102 may execute querying component 220 (FIGS. 2 and 3) to query one or more UE 12 components for power level values. Furthermore, the UE 12 may add each power level value to obtain an aggregated power level associated with the UE 12. For instance, as described herein, querying component 220 (FIG. 3) may execute arithmetic component 224 to perform one or more arithmetic operations (e.g., addition) to obtain an aggregated power level value 226. In addition, the UE 12 may compare the aggregated power level with a critical power level threshold, and may also determine that a critical power level condition exists when the aggregated power level meets or exceeds the critical power level threshold. For example, as described herein, querying component 220 may execute comparator 228 (FIG. 3) to compare the aggregated power level value 226 with a critical power level threshold 230, and may also determine that a critical power level condition 232 exists when the aggregated power level meets or exceeds the critical power level threshold 230. Furthermore, in some aspects, the UE 12 may determine whether a primary call exists upon determining that the critical power level condition exists, and may identify which of the first call associated with the first subscription and the second call associated with the second subscription is the primary call and which is a secondary call when the primary call exists. For example, power manager 102 may execute primary call determiner 221 (FIG. 2) to determine whether the first call (e.g., call 34, FIG. 1) or the second call (e.g., call 35, FIG. 1) comprises a primary call and identify the remaining one of the calls as a secondary call when the primary call exists. Additionally, in some aspects, the above mentioned step of adjusting the power level associated with the at least one UE 12 component may include adjusting a secondary call transmission power level associated with a secondary call communication resource of the secondary call. For example, power manager 102 may execute power allocation resource manager 202 to adjust a secondary call transmission power level associated with a secondary call communication resource of the secondary call (e.g., via power allocation resource manager 202). In addition, where the component whose power level is adjusted is associated with transmission in the secondary call or subscription, adjusting the secondary call transmission power level may further include determining, for example, via execution of primary call determiner 221 by power manager 102 (FIG. 2), a functioning power level value such that if the secondary call transmission power level were altered to equal a functioning power level and the primary call transmission power level was granted at a requested power level, the UE 12 would not enter a critical power level condition. Based on this functioning power level and requested power level the UE 12 may, by way of power allocation resource manager 202, reduce the secondary call transmission power level to the functioning power level and the primary call transmission power level to the requested power level.

In additional aspects, the power control methodology 400 may further utilize feedback from one or more junction temperature sensors (e.g. junction temperature sensors 112 of FIG. 1) configured to measure the temperature (related to voltage, current, and overall power dissipation) associated with one or more integrated circuits or portion(s) thereof, which may be associated with the operation of one or more UE 12 components. For example, UE 12 may execute one or more junction temperature sensors 112 to provide junction temperature measurements. Based on this temperature feedback, the UE 12 may, using the power manager 102, adjust power allocation to these temperature-measured integrated circuit components, or UE 12 components, by adjusting their respective allocated power levels. In additional aspects, as described herein and other methods of preemptive and centralized control in UEs may be utilized to control specific absorption rate (SAR) and/or battery current limiting. Of course, any subset of these non-exclusive example uses may be combined into a single power manager, which may be used to combat the negative effects that may relate to one or more of SAR, VBat droop, temperature-related performance or hardware degradation, or the like.

In summary, the methods and apparatuses discussed herein include a power manager 102 configured, during a DSDA mode, to reduce a transmit power of a call and/or reduce or limit the audio output power allocated to a speaker to a level lower than a configured maximum level. Alternatively or additionally, a configured maximum allowed transmission power level in such a DSDA use case could be reduced to a pre-determined or dynamically determined level so as to limit the magnitude of current spikes drawn from the battery 108 (FIG. 1). Furthermore, in some operating conditions, leakage current at increased circuit operating temperatures may be significant and, in some examples, can add up to several hundreds of milliamps. As such, in some aspects, regardless of the presence of active current spikes due to audio or active transmissions in a DSDA concurrent use case, the background leakage current can raise the floor from which battery voltage headroom above reset/shutdown level is measured—making it much easier for the effective battery voltage to drop below the threshold for entering the critical power level condition or commencing a software shut-down. Additionally, this issue may be exacerbated for a fast silicon process at turbo voltage. Therefore, in another aspect, the junction temperature of a particular processor, die, or other integrated circuit or portion thereof may be used to determine the maximum power level for power amplifiers or audio and/or processor frequencies to compensate for the rise in floor current when compared to lower temperatures.

Referring to FIG. 6, an example system 500 is displayed for power management in a wireless system. For example, system 500 can reside at least partially within UE 12 (FIG. 1). It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component 504 for establishing a first call and a second call at the UE. In an aspect, electrical component 504 may include one or more of first RF communication resources 104 and/or second RF communication resources 106 and/or communications component 306 (FIG. 3). Additionally, logical grouping 502 can include an electrical component 506 for determining the concurrency of the first call and the second call. In an aspect, electrical component 506 may comprise concurrent call determining component 204 (FIG. 2). Additionally, logical grouping 502 can include an electrical component 508 for adjusting a power level associated with at least one UE component based on determining the concurrency of the first call and the second call. In an aspect, electrical component 508 may comprise power allocation resource manager 202 (FIG. 2).

Additionally, system 500 can include a memory 510 that retains instructions for executing functions associated with the electrical components 504, 506, and 508, stores data used or obtained by the electrical components 504, 506, and 508, etc. While shown as being external to memory 510, it is to be understood that one or more of the electrical components 504, 506, and 508 can exist within memory 510. In one example, electrical components 504, 506, and 508 can comprise at least one processor, or each electrical component 504, 506, and 508 can be a corresponding module of at least one processor. Moreover, in an additional or alternative example, electrical components 504, 506, and 508 can be a computer program product including a computer readable medium, where each electrical component 504, 506, and 508 can be corresponding code.

Further aspects of the power management features described herein are illustrated in FIGS. 7 through 13, which may represent various power management procedures employed by a UE (e.g., UE 12). While, for purposes of simplicity of explanation, the methods are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods can alternatively be represented as a series of interrelated states or events, such as in a state diagram. Moreover, not all illustrated acts may be required to implement the methods in accordance with one or more features described herein.

Referring to FIG. 7, in operation, a UE such as UE 12 (FIG. 1) may perform one aspect of method 512 for managing UE power usage and/or allocation. For example, as described herein, UE 12 may execute and/or utilize power manager 102 (FIGS. 1 and 2) to adjust UE power usage and/or allocation. At block 514, method 512 may include determining whether a first call and a second call concurrency is detected. For example, as described herein, power manager 102 may execute concurrent call determining component 204 (FIG. 2), to determine whether first call and second call (calls 34 and 35, respectively, FIG. 1) concurrency is detected. If concurrency of calls is not detected, method 512 continues to monitor for call concurrency (block 514). However, if call concurrency is detected, method 512 continues to block 516, which may include conducting one or more preemptive power mitigation procedures. For example, power manager 102 (FIGS. 1 and 2) may execute one or more components and/or sub-components thereof, to conduct one or more preemptive power mitigation procedures. It should be understood that preemptive power mitigation procedures may be any of the non-limiting cases and/or procedures described herein to adjust UE power usage and/or allocation. Upon conducting one or more preemptive power mitigation procedures, method 512 may optionally proceed to block 518, which may include adjusting one or more UE operating characteristics. For example, power manager 102 may execute power allocation resource manager 202 to adjust one or more UE operating characteristics (e.g., reduce transmit power level). In some cases, the adjustment features of block 518 may be part of the one or more preemptive power mitigation procedures (block 516). Additionally, some of the aspects illustrated in FIG. 7 and described herein with respect thereto, may be interchangeable and/or operate under or as part of the preemptive power mitigation procedures (block 516) and the subsequent optional adjustment based thereon (block 518).

For example, referring to FIG. 8, in an aspect, method 521 continues from the concurrency call determination at block 514 (FIG. 7). Method 521 of FIG. 8, may in some cases represent one of, or the only preemptive power mitigation procedure conducted by UE 12 utilizing at least power manager 102 (FIGS. 1 and 2). At block 520, method 521 determines whether a transmit power level of a first call or a second call is greater than or equal to a transmit power level threshold. For example, as described herein, power manager 102 may execute threshold condition determining component 209 (FIG. 2) to determine whether a transmit power level of a first call or a second call (e.g., calls 34 and 35, respectively, FIG. 1) is equal to or greater than a transmit power level threshold (e.g., power level threshold 217). Further, in some aspects, method 521 may determine, at block 520, whether the transmit power level of both calls (first and second) is greater than or equal to a combined transmit power level threshold. If the transmit power level of one or both calls is determined to be less than the transmit power level threshold, method 521 may optionally proceed to block 526 in FIG. 9. Otherwise, method 521 may continue to monitor the transmit power levels at block 520. However, if the transmit power level of one or both calls is determined to be greater than or equal to the transmit power level threshold, method 521 continues to block 522, where the first call and/or second call transmit power level is reduced. For example, power manager 102 may execute power allocation resource manager 202 to reduce or otherwise limit the transmit power level of the first call and/or second call to a power reduction level 215 and/or power level threshold 217. Optionally, method 521 may continue to block 524, where a determination is made whether to conduct additional preemptive power mitigation procedures based on, for example, whether an aggregated power level is below a critical power level threshold. For example, power manager 102 may optionally execute querying component 220 to determine whether an aggregated power level value 226 is below a critical power level threshold 230. It should be understood that additional determinations may be used or made to determine whether additional preemptive power mitigation procedures are to be conducted. If the determination at block 524 provides that the aggregated power level value 226 is above the critical power level threshold, method 521 continues to block 526 in FIG. 9. However, if additional preemptive power mitigation procedures are not be conducted (e.g., aggregated power level is below critical power level threshold), then method 521 may return to block 514 in FIG. 7.

Additional aspects of the preemptive power mitigation procedures (FIG. 7) are illustrated in FIG. 9, which may include method 527. Method 527, may in some cases represent one of, or the only preemptive power mitigation procedure conducted by UE 12 utilizing at least power manager 102 (FIGS. 1 and 2). At block 526, method 527 determines whether an audio gain (e.g., audio volume) meets or exceeds an audio gain power level threshold. For example, as described herein, power manager 102 may execute threshold condition determining component 209 (FIG. 2) to determine whether an audio gain (e.g., audio volume) meets or exceeds an audio gain power level threshold. If the audio gain of an audio component (e.g., speaker 110, FIG. 1) used during one or both calls (e.g., first call 34 and second call 35. FIG. 1) is determined to be less than the audio gain power level threshold, method 527 may optionally proceed to block 532 in FIG. 10. Otherwise, method 527 may continue to monitor the audio gain at block 526. However, if the audio gain is determined to be greater than or equal to the audio gain power level threshold, method 527 continues to block 528, where the audio gain is reduced or limited to the audio gain power level threshold. For example, power manager 102 may execute power allocation resource manager 202 to reduce or otherwise limit the audio gain to a power reduction level 215 and/or audio gain power level threshold 217. Optionally, method 527 may continue to block 530, where a determination is made whether to conduct additional preemptive power mitigation procedures based on, for example, whether an aggregated power level is below a critical power level threshold. For example, power manager 102 may optionally execute querying component 220 to determine whether an aggregated power level value 226 is below a critical power level threshold 230. It should be understood that additional determinations may be used or made to determine whether additional preemptive power mitigation procedures are to be conducted. If the determination at block 530 provides that the aggregated power level value 226 is above the critical power level threshold, method 527 continues to block 532 in FIG. 10. However, if additional preemptive power mitigation procedures are not be conducted (e.g., aggregated power level is below critical power level threshold), then method 527 may return to block 514 in FIG. 7.

Further, in the aspects of FIG. 10, method 533 continues from the concurrency call determination at block 514 (FIG. 7). Method 533 of FIG. 10, may in some cases represent the only, or one of a number of preemptive power mitigation procedures conducted by UE 12 utilizing at least power manager 102 (FIGS. 1 and 2). At block 532, method 533 determines whether a transmit power level of a first call or a second call is greater than or equal to a transmit power level threshold. For example, as described herein, power manager 102 may execute threshold condition determining component 209 (FIG. 2) to determine whether a transmit power level of a first call or a second call (e.g., calls 34 and 35, respectively, FIG. 1) is greater than or equal to a transmit power level threshold (e.g., power level threshold 217). Further, in some aspects, method 533 may determine, at block 532, whether the transmit power level of both calls (first and second) is greater than or equal to a combined transmit power level threshold. If the transmit power level of one or both calls is determined to be less than the transmit power level threshold, method 533 may optionally proceed to block 538 in FIG. 11. Otherwise, method 533 may continue to monitor the transmit power levels at block 532. However, if the transmit power level of one or both calls is determined to be greater than or equal to the transmit power level threshold, method 533 continues to block 534, where the audio gain (e.g., volume) of an audio component (e.g., speaker 110, FIG. 1) may be reduced and/or limited. For example, power manager 102 may execute power allocation resource manager 202 to reduce or otherwise limit the audio gain to a power reduction level 215 and/or (audio gain) power level threshold 217. Optionally, method 533 may continue to block 536, where a determination is made whether to conduct additional preemptive power mitigation procedures based on, for example, whether an aggregated power level is below a critical power level threshold. For example, power manager 102 may optionally execute querying component 220 to determine whether an aggregated power level value 226 is below a critical power level threshold 230. It should be understood that additional determinations may be used or made to determine whether additional preemptive power mitigation procedures are to be conducted. If the determination at block 536 provides that the aggregated power level value 226 is above the critical power level threshold, method 533 continues to block 538 in FIG. 11. However, if additional preemptive power mitigation procedures are not to be conducted (e.g., aggregated power level is below critical power level threshold), then method 533 may return to block 514 in FIG. 7.

In another aspect, referring to FIG. 11, additional preemptive power mitigation procedures (FIG. 7) are illustrated, which may include method 539. Method 539, may in some cases represent one or more preemptive power mitigation procedures conducted by UE 12 utilizing at least power manager 102 (FIGS. 1 and 2). At block 538, method 539 determines whether a junction temperature meets or exceeds a junction temperature level threshold. For example, as described herein, power manager 102 may execute threshold condition determining component 209 (FIG. 2) to determine whether a junction temperature (e.g., temperature of the actual semiconductor in the UE 12) meets or exceeds a junction temperature level threshold 219. If the junction temperature is determined to be less than the junction temperature level threshold, method 539 may optionally proceed to block 544 in FIG. 12. Otherwise, method 539 may continue to monitor the junction temperature at block 538. However, if the junction temperature is determined to be greater than or equal to the junction temperature level threshold, method 539 continues to block 540, where the audio gain is reduced or limited to, for instance, the audio gain power level threshold. For example, power manager 102 may execute power allocation resource manager 202 to reduce or otherwise limit the audio gain to a power reduction level 215 and/or audio gain power level threshold 217. Optionally, method 539 may continue to block 542, where a determination is made whether to conduct additional preemptive power mitigation procedures based on, for example, whether an aggregated power level is below a critical power level threshold. For example, power manager 102 may optionally execute querying component 220 to determine whether an aggregated power level value 226 is below a critical power level threshold 230. It should be understood that additional determinations may be used or made to determine whether additional preemptive power mitigation procedures are to be conducted. If the determination at block 542 provides that the aggregated power level value 226 is above the critical power level threshold, method 544 continues to block 532 in FIG. 12. However, if additional preemptive power mitigation procedures are not be conducted (e.g., aggregated power level is below critical power level threshold), then method 539 may return to block 514 in FIG. 7.

In a further aspect, referring to FIG. 12, method 545 continues from the concurrency call determination at block 514 (FIG. 7). Method 545, may in some cases represent one or more preemptive power mitigation procedures conducted by UE 12 utilizing at least power manager 102 (FIGS. 1 and 2). At block 544, method 545 determines whether first call and second call transmit burst occasions overlap. For example, as described herein, power manager 102 may execute power scheduling component 212 (FIG. 2) to determine whether first call and second call (e.g., calls 34 and 35, respectively, FIG. 1) transmit burst occasions overlap. If the first call and second call transmit burst occasions do not overlap, method 545 may optionally proceed to block 550 in FIG. 13. Otherwise, method 545 may continue to monitor transmit burst occasion overlaps at block 544. However, if the first call and second call transmit burst occasions overlap, method 545 continues to block 546, where the first call and/or second call transmit power level is reduced. For example, power manager 102 may execute power allocation resource manager 202 to reduce or otherwise limit the transmit power level of the first call and/or second call to a power reduction level 215 and/or power level threshold 217. In other aspects, an audio gain (e.g., volume) may be reduced or otherwise limited to a reduced power level or threshold level based on the determination at block 544. Optionally, method 545 may continue to block 548, where a determination is made whether to conduct additional preemptive power mitigation procedures based on, for example, whether an aggregated power level is below a critical power level threshold. For example, power manager 102 may optionally execute querying component 220 to determine whether an aggregated power level value 226 is below a critical power level threshold 230. It should be understood that additional determinations may be used or made to determine whether additional preemptive power mitigation procedures are to be conducted. If the determination at block 548 provides that the aggregated power level value 226 is above the critical power level threshold, method 545 continues to block 550 in FIG. 12. However, if additional preemptive power mitigation procedures are not to be conducted (e.g., aggregated power level is below critical power level threshold), then method 545 may return to block 514 in FIG. 7.

In an additional aspect, referring to FIG. 13, method 551 may continue from the concurrency call determination at block 514 (FIG. 7). Method 551 may in some cases be one of many, or the only preemptive power mitigation procedure conducted by utilizing at least power manager 102 (FIGS. 1 and 2). At block 550, method 551 determines whether an operating frequency of one or more UE components is greater than or equal to an operating frequency threshold value. For example, as described herein, power manager 102 may execute threshold condition determining component 209 to determine whether an operating frequency of one or more UE components is greater than or equal to an operating frequency threshold value (e.g., power level threshold 217). If the operating frequency is determined to be less than the operating frequency threshold value, method 551 may optionally continue to perform additional preemptive power mitigation procedures, or continue to monitor the operating frequency at block 550. However, if the operating frequency is determined to meet or exceed the operating frequency threshold, method 551 may continue to block 552, where the operating frequency may be reduced and/or limited (e.g., via power allocation resource manager 202) to below a defined frequency and/or power level. Optionally, method 551 may continue to block 554, where a determination is made whether to conduct additional preemptive power mitigation procedures based on, for example, whether an aggregated power level is below a critical power level threshold. For example, power manager 102 may optionally execute querying component 220 to determine whether an aggregated power level value 226 is below a critical power level threshold 230. It should be understood that additional determinations may be used or made to determine whether additional preemptive power mitigation procedures are to be conducted. If the determination at block 554 provides that the aggregated power level value 226 is above the critical power level threshold, method 551 continues to perform additional preemptive power mitigation procedures. However, if additional preemptive power mitigation procedures are not be conducted (e.g., aggregated power level is below critical power level threshold), then method 551 may return to block 514 in FIG. 7.

FIG. 14 is a block diagram illustrating an example of a hardware implementation for an apparatus 600 employing a processing system 614 for carrying out aspects of the present disclosure, such as methods for improved power control and management in UEs, such as DSDA UEs similar to UE 12 (FIG. 1). In this example, the processing system 614 may be implemented with a bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, power manager 102 (FIGS. 1 and 2).

The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Further, power manager 102 (FIG. 1) may be implemented by any one or more of processor 604 and computer-readable medium 606. For example, the processor 604 and/or computer-readable medium 606 may be configured to, via power manager 102, to perform various power management functions/procedures in a wireless communications device (e.g., UE 12).

The various concepts presented throughout this disclosure may be implemented across a broad variety of telecommunication systems, network architectures, and communication standards. By way of example and without limitation, the aspects of the present disclosure illustrated in FIG. 15 are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. In an aspect, UE 710 may be the same as or similar to UE 12 (FIG. 1). In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring, and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a NodeB 708 may be considered as including a physical (PHY) layer and a medium access control (MAC) layer. Further, communication between a UE 710 and an RNC 706 by way of a respective NodeB 708 may be considered as including a radio resource control (RRC) layer. In the instant specification, the PHY layer may be considered layer 1; the MAC layer may be considered layer 3; and the RRC layer may be considered layer 3. Information herein below utilizes terminology introduced in the RRC Protocol Specification, 3GPP TS 75.331 v9.1.0, incorporated herein by reference.

The geographic region covered by the RNS 707 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses, and may be the UE 12 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a NodeB 708 to a UE 710, and the UL, also called the reverse link, refers to the communication link from a UE 710 to a NodeB 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call (e.g. a voice and/or data call) is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Referring to FIG. 16, an access network 800 in a UTRAN architecture is illustrated in which a UE, such as a UE the same as or similar to UE 12 (FIG. 1) may operate. The multiple access wireless communication system includes multiple cellular regions (cells), including cells 802, 804, and 806, each of which may include one or more sectors. The multiple sectors can be formed by groups of antennas with each antenna responsible for communication with UEs, which may be the same as or similar to UE 12 (FIG. 1) in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point to a CN 704 (FIG. 7) for all the UEs 830, 832, 834, 836, 838, 840 in the respective cells 802, 804, and 806. Additionally, each NodeB 842, 844, 846 and UEs 830, 832, 834, 836, 838, 840 may be UE 12 of FIG. 1 and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (FIG. 15), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 17. FIG. 17 is a conceptual diagram illustrating an example of the radio protocol architecture for the user and control planes.

Turning to FIG. 17, the radio protocol architecture for the UE, such as UE 12 (FIG. 1), and node B is shown with three layers: Layer 1, Layer 2, and Layer 3. Layer 1 is the lowest layer and implements various physical layer signal processing functions. Layer 1 will be referred to herein as the physical layer 906. Layer 2 (L2 layer) 908 is above the physical layer 906 and is responsible for the link between the UE and node B over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between NodeBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

FIG. 18 is a block diagram of a NodeB 1010 in communication with a UE 1050, where the NodeB 1010 may be the NodeB 708 in FIG. 15, and the UE 1050 may be UE 600 of FIG. 14 or UE 12 of FIG. 1. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the NodeB 1010. More specifically, the receive processor 1070 descrambles and despreads the symbols, and then determines the most likely signal constellation points transmitted by the NodeB 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the NodeB 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the NodeB 1010 or from feedback contained in the midamble transmitted by the NodeB 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the NodeB 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the NodeB 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the NodeB 1010 and the UE 1050, respectively. A scheduler/processor 1046 at the NodeB 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB). IEEE 802.11 (Wi-Fi), IEEE 802.16 (WiMAX), IEEE 802.20, Ultra-Wideband (UWB), Bluetooth, and/or other suitable systems.

The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for power control management in a user equipment (UE), comprising:
   establishing a first call associated with a first subscription of the UE and a second call associated with a second subscription of the UE, wherein the first call and the second call are concurrent for a period of time;
   adding one or more power level value to obtain an aggregated power level associated with the UE component during the period of time to obtain an aggregated power level for the UE;
   comparing the aggregated power level with a critical power level threshold;
   determining that a critical power level condition exists where the aggregated power level exceeds a threshold value; and
   adjusting the power level associated with the at least one UE component is further based on determining that the critical power level exists.

2. The method of claim 1, wherein adjusting the power level comprises reducing a transmit power level of at least one of the first call and the second call.

3. The method of claim 2, wherein reducing the transmit power level comprises reducing the transmit power level of the at least one of the first call and the second call such that an effective combined transmit power level meets a threshold.

4. The method of claim 2, wherein reducing the transmit power level comprises reducing the transmit power level of the at least one of the first call and the second call to a transmit power level threshold.

5. The method of claim 2, wherein reducing the transmit power level further comprises reducing the transmit power level of the at least one of the first call and the second call by a power reduction level value.

6. The method of claim 1, further comprising:
   determining that a transmit power level of at least one of the first call and the second call is above a transmit power level threshold; and
   wherein adjusting the power level associated with at least one UE component further comprises reducing a transmit power level of the at least one of the first call and the second call determined to have the transmit power level above the transmit power level threshold.

7. The method of claim 1, wherein the at least one UE component comprises a speaker, and wherein adjusting the power level associated with at least one UE component comprises reducing a speaker power level associated with the speaker.

8. The method of claim 7, wherein reducing the speaker power level further comprises reducing the speaker power level to an audio gain power level threshold.

9. The method of claim 7, further comprising:
determining a transmit power level of at least one of the first call and the second call is above a transmit power level threshold; and
wherein reducing the speaker power level is based on a determination that the transmit power level of the at least one of the first call and the second call is above the transmit power level threshold.

10. The method of claim 7, further comprising:
determining a junction temperature meets or exceeds a junction temperature level threshold; and
wherein reducing the speaker power level is based on a determination that the junction temperature meets or exceeds the junction temperature level threshold.

11. The method of claim 1, wherein the at least one UE component comprises at least one of a central processing unit, an application processor, and a graphics processing unit, and further comprising reducing an operating frequency associated with the at least one UE component.

12. The method of claim 1, further comprising:
determining that a junction temperature meets or exceeds a junction temperature level threshold; and
wherein adjusting the power level associated with at least one UE component further comprises reducing a transmit power level of the at least one of the first call and the second call based on a determination that the junction temperature meets or exceeds the junction temperature level threshold.

13. The method of claim 12, further comprising:
reducing a speaker power level based on the determination that the junction temperature meets or exceeds the junction temperature level threshold.

14. The method of claim 1, further comprising:
determining that an overlap exists in transmit burst occasions of the first call and the second call; and
wherein adjusting the power level associated with at least one UE component comprises reducing the transmit power level of at least one of the first call and the second call based on determining that the overlap between the transmission burst occasions exists.

15. The method of claim 1, further comprising:
determining which of the first call and the second call comprises a primary call;
identifying a remaining call of the first call and the second call as a secondary call; and
wherein adjusting the power level associated with the at least one UE component comprises reducing a secondary call transmission power level associated with a secondary call communication resource of the secondary call.

16. The method of claim 1, wherein the at least one UE component comprises at least one of a transmitter, a modem, a processor, a display, an application, a camera, and a vibration component.

17. An apparatus for power control management in a user equipment (UE), comprising:
means for establishing a first call associated with a first subscription of the UE and a second call associated with a second subscription of the UE, wherein the first call and the second call are concurrent for a period of time;
mean for adding one or more power level values corresponding to each of one or more UE components during the period of time to obtain an aggregated power level of the UE;
mean for comparing the aggregated power level with a critical power level threshold;
mean for determining that a critical power level condition exists where the aggregated power level exceeds a threshold value; and
mean for adjusting the power level associated with the at least one UE component based on determining that the critical power level exists.

18. A non-transitory computer-readable storage medium storing computer executable code for power control management comprising:
code for establishing a first call associated with a first subscription of the user equipment (UE) and a second call associated with a second subscription of the UE, wherein the first call and the second call are concurrent for a period of time;
code for adding one or more power level values corresponding to each of one or more UE components during the period of time to obtain an aggregated power level of the UE;
code for comparing the aggregated power level with a critical power level threshold;
code for determining that a critical power level condition exists where the aggregated power level exceeds a threshold value; and
code for adjusting the power level associated with the at least one UE component based on determining that the critical power level exists.

19. An apparatus for power control management in a user equipment (UE), comprising:
at least one processor; and
a memory coupled to the at least one processor, wherein the at least one processor is configured to:
establishing a first call associated with a first subscription of the user equipment (UE) and a second call associated with a second subscription of the UE, wherein the first call and the second call are concurrent for a period of time;
adding one or more power level values corresponding to each of one or more UE components during the period of time to obtain an aggregated power level of the UE;
comparing the aggregated power level with a critical power level threshold;
determining that a critical power level condition exists where the aggregated power level exceeds a threshold value; and
adjusting the power level associated with the at least one UE component based on determining that the critical power level exists.

20. The apparatus of claim 19, wherein to adjust the power level, the at least one processor is further configured to reduce transmit power level of at least one of the first call and the second call.

21. The apparatus of claim 20, wherein to reduce the transmit power level, the at least one processor is further configured to reduce the transmit power level of the at least one of the first call and the second call such that an effective combined transmit power level meets a threshold.

22. The apparatus of claim 20, wherein to reduce the transmit power level, the at least one processor is further configured to reduce the transmit power level of the at least one of the first call and the second call to a transmit power level threshold.

23. The apparatus of claim 20, wherein to reduce the transmit power level, the processor is further configured to reduce the transmit power level of the at least one of the first call and the second call by a power reduction level value.

24. The apparatus of claim 19, wherein the at least one processor is further configured to:
- determine that a transmit power level of at least one of the first call and the second call is above a transmit power level threshold; and
- wherein to adjust the power level associated with at least one UE component, the processor is further configured to reduce a transmit power level of the at least one of the first call and the second call determined to have the transmit power level above the transmit power level threshold.

25. The apparatus of claim 19, wherein the at least one UE component comprises a speaker, and wherein to adjust the power level associated with at least one UE component, the at least one processor is further configured to reduce a speaker power level associated with the speaker.

26. The apparatus of claim 25, wherein to reduce the speaker power level, the at least one processor is further configured to reduce the speaker power level to an audio gain power level threshold.

27. The apparatus of claim 25, wherein the at least one processor is further configured to:
- determine a transmit power level of at least one of the first call and the second call is above a transmit power level threshold; and
- wherein to reduce the speaker power level is based on a determination that the transmit power level of the at least one of the first call and the second call is above the transmit power level threshold.

28. The apparatus of claim 25, wherein the at least one processor is further configured to:
- determine a junction temperature meets or exceeds a junction temperature level threshold; and
- wherein to reduce the speaker power level is based on a determination that the junction temperature meets or exceeds the junction temperature level threshold.

29. The apparatus of claim 19, wherein the at least one UE component comprises at least one of a central processing unit, an application processor, and a graphics processing unit, and further comprising reducing an operating frequency associated with the at least one UE component.

30. The apparatus of claim 19, wherein the at least one processor is further configured to:
- determine that a junction temperature meets or exceeds a junction temperature level threshold; and
- wherein to adjust the power level associated with at least one UE component, the at least one processor is further configured to reduce a transmit power level of the at least one of the first call and the second call based on a determination that the junction temperature meets or exceeds the junction temperature level threshold.

31. The apparatus of claim 30, in the at least one processor is further configured to reduce a speaker power level based on the determination that the junction temperature meets or exceeds the junction temperature level threshold.

32. The apparatus of claim 19, wherein the at least one processor is further configured to:
- determine that an overlap exists in transmit burst occasions of the first call and the second call; and
- wherein to adjust the power level associated with at least one UE component, the at least one processor is further configured to reduce the transmit power level of at least one of the first call and the second call based on determining that the overlap between the transmission burst occasions exists.

33. The apparatus of claim 19, wherein the at least one processor is further configured to:
- determine which of the first call and the second call comprises a primary call;
- identify a remaining call of the first call and the second call as a secondary call; and
- wherein to adjust the power level associated with the at least one UE component, the at least one processor is further configured to reduce a secondary call transmission power level associated with a secondary call communication resource of the secondary call.

* * * * *